United States Patent
Nagai et al.

(10) Patent No.: US 11,126,945 B2
(45) Date of Patent: Sep. 21, 2021

(54) ORGANIZATION MANAGEMENT SUPPORT SYSTEM, ORGANIZATION MANAGEMENT SUPPORT METHOD, AND ORGANIZATION MANAGEMENT SUPPORT APPARATUS

(71) Applicant: Hitachi, Ltd., Tokyo (JP)

(72) Inventors: Takayuki Nagai, Tokyo (JP); Hironori Emaru, Tokyo (JP); Junji Kinoshita, Tokyo (JP); Tatsuya Sato, Tokyo (JP)

(73) Assignee: HITACHI, LTD., Tokyo (JP)

( * ) Notice: Subject to any disclaimer, the term of this patent is extended or adjusted under 35 U.S.C. 154(b) by 130 days.

(21) Appl. No.: 16/568,429

(22) Filed: Sep. 12, 2019

(65) Prior Publication Data

US 2020/0111040 A1    Apr. 9, 2020

(30) Foreign Application Priority Data

Oct. 5, 2018   (JP) .............................. JP2018-189625

(51) Int. Cl.
    *G06F 16/00*     (2019.01)
    *G06Q 10/06*     (2012.01)
    *G06F 16/27*     (2019.01)

(52) U.S. Cl.
    CPC ......... *G06Q 10/0637* (2013.01); *G06F 16/27* (2019.01); *G06Q 10/067* (2013.01)

(58) Field of Classification Search
    CPC ....................................................... G06F 16/27
    See application file for complete search history.

(56) References Cited

U.S. PATENT DOCUMENTS

| | | | |
|---|---|---|---|
| 2019/0036710 A1* | 1/2019 | Qiu | G06Q 20/401 |
| 2019/0319794 A1* | 10/2019 | Haidar | H04L 63/10 |
| 2019/0347656 A1* | 11/2019 | Lu | G06F 16/1824 |
| 2020/0387503 A1* | 12/2020 | Zhang | G06F 16/2379 |

OTHER PUBLICATIONS

"Hyperledger Fabric" (retrieved on Jun. 30, 2018, Internet <URL:http://hyperledger-fabric.readthedocs.io/en/latest/>).

* cited by examiner

*Primary Examiner* — Khanh B Pham
(74) *Attorney, Agent, or Firm* — Baker Botts L.L.P.

(57) ABSTRACT

A distributed ledger node of an organization management support system includes a request unit configured to request a determination on participation to a business network from a node of another organization on a distributed ledger system when receiving a request for new participation to a business network from a node of a specific organization, and a management unit configured to collect a determination result of at least the node of the other organization, finally determine the participation on the basis of the collected result, and reply to the node of the specific organization with a result of the final determination.

12 Claims, 27 Drawing Sheets

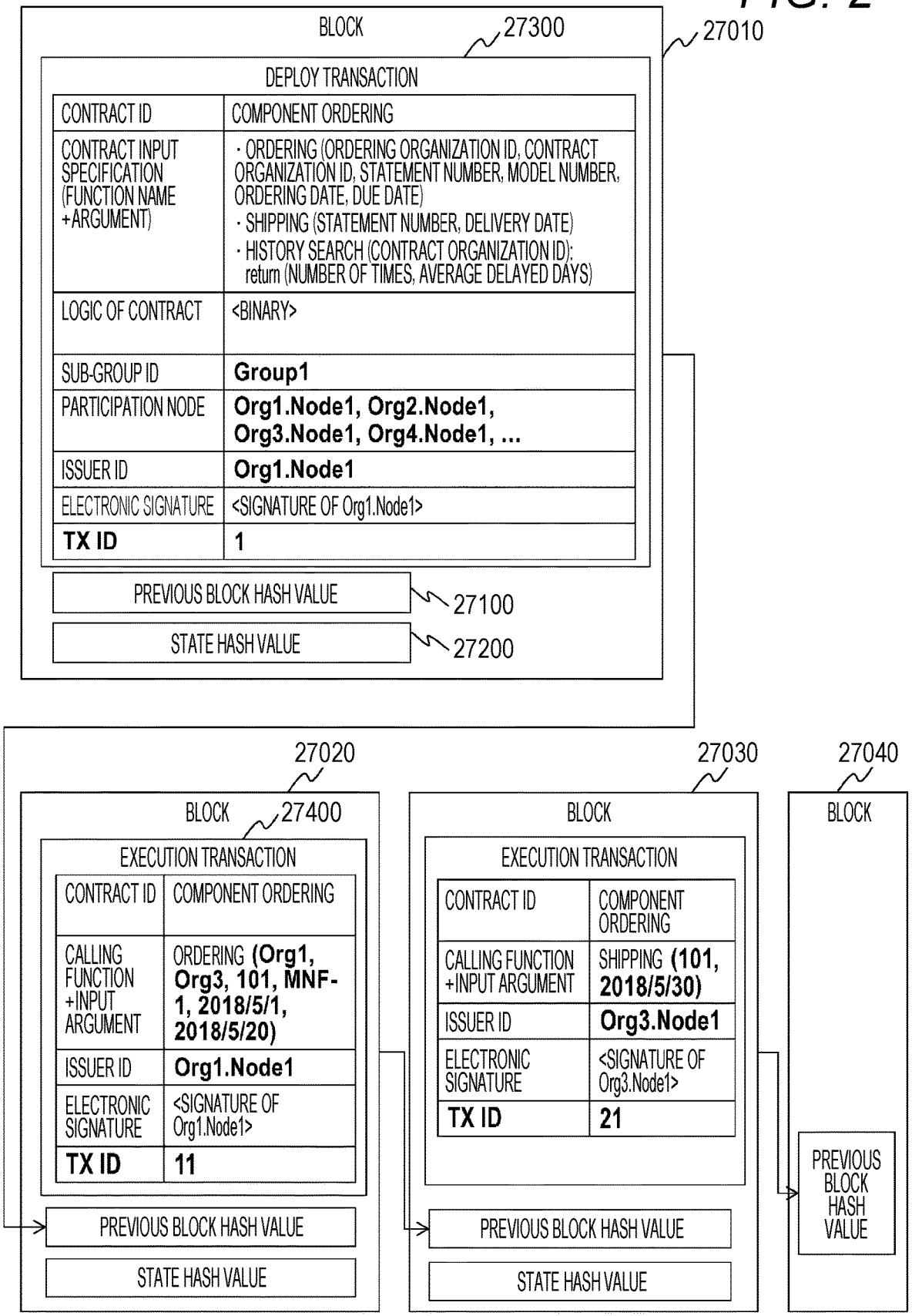

| CONTRACT ID | CONTRACT SUBJECT | SUB-GROUP ID | INTERNAL TABLE |
|---|---|---|---|
| COMPONENT ORDERING | \<BINARY\> | Group1 | TRANSACTION HISTORY DATA  28040<br><br>| TX ID | ORDERING ORGANIZATION ID | CONTRACT ORGANIZATION ID | STATEMENT NUMBER | MODEL NUMBER | ORDERING DATE | DUE DATE | DELIVERY DATE |<br>|---|---|---|---|---|---|---|---|<br>| : | : | : | : | : | : | : | : |<br>| 11, 21 | Org1 | Org3 | 101 | MNF-1 | 2018/5/1 | 2018/5/20 | 2018/5/30 |<br>| : | : | : | : | : | : | : | : |<br>| 31 | Org2 | Org4 | 201 | MNF-11 | 2018/6/1 | 2018/7/1 | - |<br>| : | : | : | : | : | : | : | : |<br><br>PARTICIPATION NODE DATA  28050<br><br>| ORGANIZATION ID | NODE ID |<br>|---|---|<br>| Org1 | Node1 |<br>| Org2 | Node1 |<br>| Org3 | Node1 |<br>| Org4 | Node1 | |
| . . . | . . | . . | . . . |

FIG. 4A

| ORGANIZATION ID 32010 | ORGANIZATION NAME 32020 | PUBLIC KEY 32030 |
|---|---|---|
| Org1 | A CORPORATION | <BINARY> |
| Org2 | B CORPORATION | <BINARY> |
| Org3 | C CORPORATION | <BINARY> |
| Org4 | D CORPORATION | <BINARY> |
| Org5 | E CORPORATION | <BINARY> |
| : | : | : |

| ORGANIZATION ID 32110 | NODE ID 32120 | SUB-GROUP ID 32130 | SUB-GROUP REPRESENTATIVE NODE 32140 |
|---|---|---|---|
| Org1 | Node1 | Group1 | O |
|  | Node2 | Group3 | O |
| Org2 | Node1 | Group1 |  |
|  | Node2 | Group3 |  |
| Org3 | Node1 | Group1 |  |
|  | Node2 | Group2 | O |
| Org4 | Node1 | Group1 |  |
|  | Node2 | Group2 |  |
| Org5 | Node1 | - |  |
|  | Node2 | Group2 |  |
|  | Node3 | Group3 |  |
| : | : | : | : |

32100

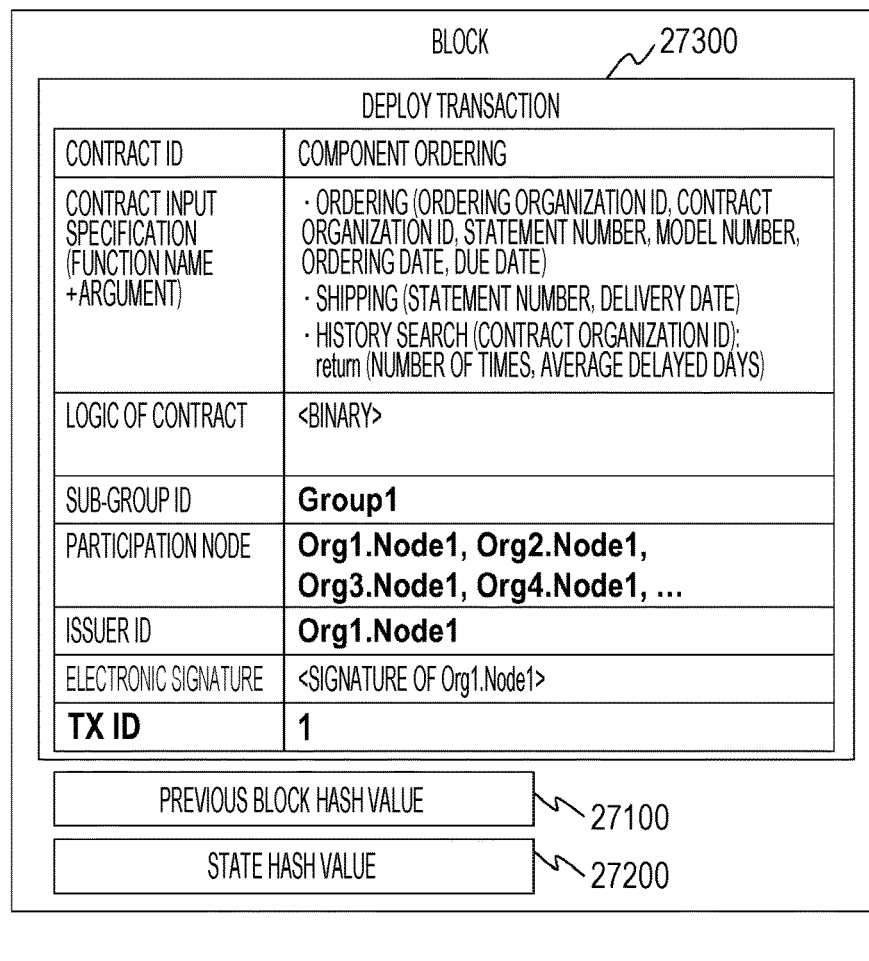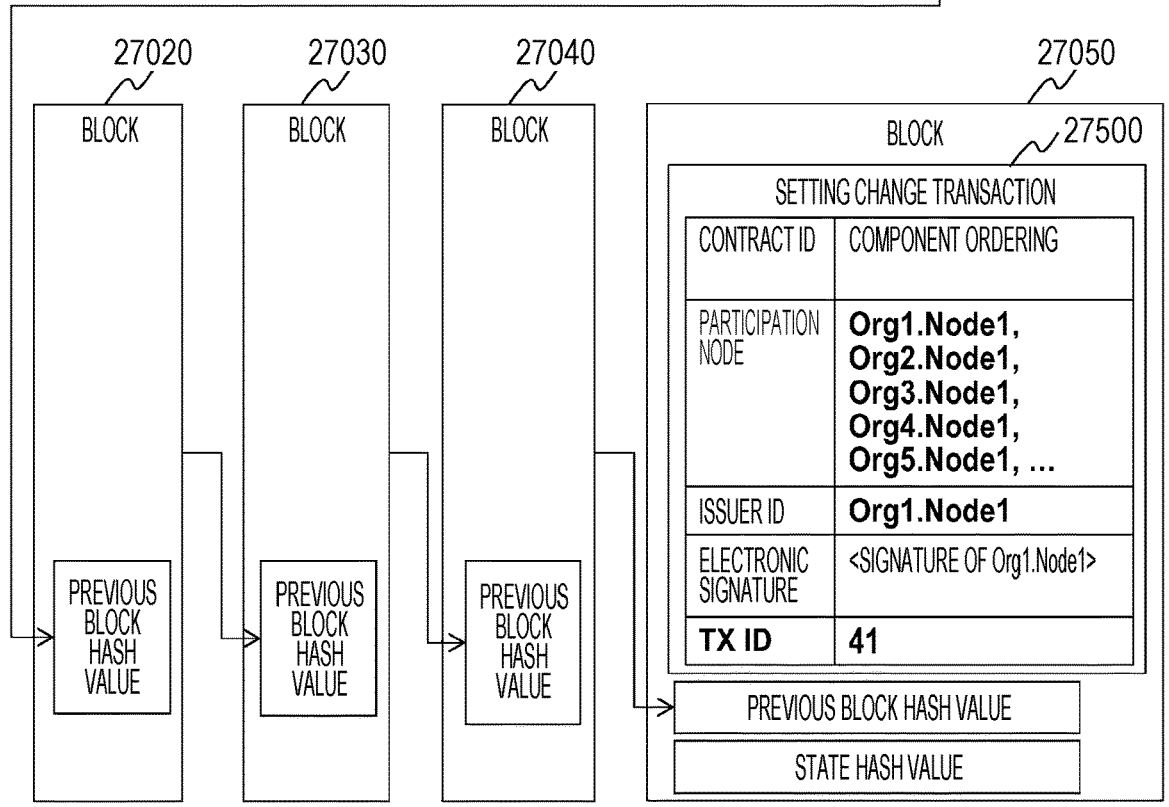
FIG. 12A

FIG. 12B

| CONTRACT ID 28010 | CONTRACT SUBJECT 28020 | SUB-GROUP ID 28030 | INTERNAL TABLE 28040 | | | | | | | 28000 |
|---|---|---|---|---|---|---|---|---|---|---|
| COMPONENT ORDERING | <BINARY> | Group1 | TRANSACTION HISTORY DATA 28040 ||||||||
| | | | TX ID | ORDERING ORGANIZATION ID | CONTRACT ORGANIZATION ID | STATEMENT NUMBER | MODEL NUMBER | ORDERING DATE | DUE DATE | DELIVERY DATE |
| | | | : | : | : | : | : | : | : | : |
| | | | 11, 21 | Org1 | Org3 | 101 | MNF-1 | 2018/5/1 | 2018/5/20 | 2018/5/30 |
| | | | : | : | : | : | : | : | : | : |
| | | | 31 | Org2 | Org4 | 201 | MNF-11 | 2018/6/1 | 2018/7/1 | - |
| | | | : | : | : | : | : | : | : | : |
| | | | PARTICIPATION NODE DATA 28050 ||||||||
| | | | ORGANIZATION ID | NODE ID |||||||
| | | | Org1 | Node1 |||||||
| | | | Org2 | Node1 |||||||
| | | | Org3 | Node1 |||||||
| | | | Org4 | Node1 |||||||
| | | | Org5 | Node1 |||||||
| . . . | . . | . . | . . . | | | | | | | |

FIG. 22B

| CONTRACT ID (28010) | CONTRACT SUBJECT (28020) | INTERNAL TABLE (28030) | | | | |
|---|---|---|---|---|---|---|
| SUB-GROUP MANAGEMENT | <BINARY> | ORGANIZATION STRUCTURE MANAGEMENT TABLE (28060) | | | | |
| | | SUB-GROUP ID | PARTICIPATION NODE | | SUB-GROUP REPRESENTATIVE NODE | |
| | | | ORGANIZATION ID | NODE ID | | |
| | | Group1 | Org1 | Node1 | O | |
| | | | Org2 | Node1 | | |
| | | Group2 | Org3 | Node1 | O | |
| | | | Org4 | Node1 | | |
| | | | Org5 | Node2 | | |
| | | Group3 | Org1 | Node2 | O | |
| | | | Org2 | Node2 | | |
| | | : | : | : | : | |
| . . . | . . | . . . | | | | |

(Table ID: 28000)

ORGANIZATION MANAGEMENT SUPPORT SYSTEM, ORGANIZATION MANAGEMENT SUPPORT METHOD, AND ORGANIZATION MANAGEMENT SUPPORT APPARATUS

CROSS-REFERENCE TO RELATED APPLICATION

This application claims priority pursuant to 35 U.S.C. § 119 from Japanese Patent Application No. 2018-189625, filed on Oct. 5, 2018, the entire disclosure of which is incorporated herein by reference.

BACKGROUND

Technical Field

The present invention relates to an organization management support system, an organization management support method, and an organization management support apparatus.

Related Art

Conventionally, a distributed ledger technology using a blockchain (hereinafter, referred to as BC) is disclosed as a technology for instituting a transaction performed through a reliable centralized organization such as a financial institute or a government into a direct transaction through P2P (Peer to Peer) among users.

The distributed ledger technology proposes various derivative technologies and is continuing to evolve. As main characteristics of the present situation, (1) the transaction among the participants to the distributed ledger is decided by the (all or specific) participants, instead of a centralized organization, (2) a plurality of transactions are collected as a block and recorded in the distributed ledger (called a blockchain) in series, and a hash calculation is performed on the consecutive blocks to make a change impossible actually, and (3) all the participants share the same ledger data to be able to check all the transactions.

Such a distributed ledger technology using BC is considered to be applied in a wide range of fields such as finance and manufacturing industries as a mechanism for managing/sharing reliable data and executing/managing contract-based transactions.

The use of an infrastructure providing the distributed ledger (hereinafter referred to as a distributed ledger infrastructure) enables information sharing and transactions among multiple entities without management by the centralized organization (for example, enterprises related to a consortium and a supply chain in a specific industry).

Further, the blockchain or the distributed ledger in which only a computer permitted by one or a plurality of specific groups or persons are authorized for transaction is called a "consortium type". In the consortium type, transaction confirmation can be executed faster. Therefore, in a case where the distributed ledger is used in the consortium of a specific industry, the consortium type is generally used.

In addition, in some of the distributed ledger infrastructures, a logic in which not only the transaction data but also the transaction condition is described in the distributed ledger is also made manageable in order to be applied even to a complicate transaction condition or various applications. The logic is called a "smart contract" (hereinbelow, also referred to as SC).

In the online document "Hyperledger Fabric" (retrieved on Jun. 30, 2018, Internet <URL:http://hyperledger-fabric-.readthedocs.io/en/latest/>), there is disclosed a technology related to the distributed ledger infrastructure which has a function of executing SC. In such a distributed ledger infrastructure, information (ledger) is shared on a plurality of nodes by accepting transactions (hereinafter, referred to as TX) while making an agreement at a predetermined agreement level among nodes of the distributed ledger infrastructure, executing TX at each node, and holding TX results. In addition, the distributed ledger infrastructure is provided an SC execution function for performing a predetermined logic to TX.

On the other hand, the consortium type BC is used in a common business among the organizations to improve the efficiency of business process.

For example, the distributed ledger technology using BC is applied to a supply chain management field, trade records among companies are recorded in the ledger, and the records are linked as needed so as to trace a flow of a product among the companies.

In this case, the ledger containing history information such as shipment, receipt, and production of all companies is shared among the companies. Since this situation is not necessarily desirable from the viewpoint of confidentiality of each company, it is assumed that only the organizations in a predetermined transaction relationship share the ledger.

Therefore, the online document "Hyperledger Fabric" (retrieved on Jun. 30, 2018, Internet <URL:http://hyperledger-fabric.readthedocs.io/en/latest/>) introduces a concept called "Channel" in which the distributed ledger is logically divided in accordance with the above case. Herein, the distributed ledger logically-divided by the channel is called a sub-ledger.

The distributed ledger infrastructure in this case is one distributed ledger infrastructure in which all organizations participate, and, in the meantime, is internally configured by a plurality of distributed ledger infrastructures which are logically divided. Hereinbelow, a set of nodes belonging to the logically-divided distributed ledger infrastructure will be called "sub-group".

The node belonging to the above sub-group shares a predetermined sub-group only at the nodes in the sub-group, performs SC installed in every sub-system when TX is performed, and updates the data of the sub-ledger.

SUMMARY OF THE INVENTION

As for a consortium type BC described above, a participation request is received from an organization A outside the consortium. At present, however, there is no clear mechanism for determining whether or not participation of the organization A is approved after making an agreement among the existing organizations of the consortium.

From the viewpoint of the outside of the consortium, the organization's configuration and role in the consortium (who will perform the reliability assessment of an addition organization or a target organization) are unclear, and no matter that the participation request is performed as described above, there is still a problem that it is not clear who should request participation in the consortium participation.

In addition, even in a case where only an authorized person of a specific work belonging to the sub-group shares the sub-ledger, a similar problem exists when a new organization intends to participate in the sub-group.

An object of the invention is to provide a technology that an affiliation process of a member in the blockchain of the consortium type can be efficiently performed while securing reliability.

An organization management support system of the invention to solve the above problem includes a request unit configured to, in a case where a predetermined node of each organization of a business network in a distributed ledger system receives a request for a new participation to the business network from a node of a specific organization, request a determination on participation of the specific organization to the business network from a node of another organization on the distributed ledger system, and a management unit configured to collect determination results from the node of at least the other organization, finally determine the participation on the basis of the collected result, and reply to the node of the specific organization with a result of the final determination.

In addition, an organization management support method of the invention includes requesting, in a case where a predetermined node of each organization of a business network in a distributed ledger system receives a request for a new participation to the business network from a node of a specific organization, a determination on participation of the specific organization to the business network from a node of another organization on the distributed ledger system, and performing a process of collecting determination results from the node of at least the other organization, finally determining the participation on the basis of the collected result, and replying to the node of the specific organization with a result of the final determination.

In addition, an organization management support apparatus of the invention includes a request unit configured to, in a case where a predetermined node of each organization of a business network in a distributed ledger system receives a request for a new participation to the business network from a node of a specific organization, request a determination on participation of the specific organization to the business network from a node of another organization on the distributed ledger system, and a management unit configured to collect determination results from the node of at least the other organization, finally determine the participation on the basis of the collected result, and reply to the node of the specific organization with a result of the final determination.

According to the invention, an affiliation process of a member in the blockchain of the consortium type can be efficiently performed while securing reliability.

BRIEF DESCRIPTION OF THE DRAWINGS

FIG. 2 is a diagram illustrating an exemplary configuration of a blockchain which is included in a distributed ledger of the distributed ledger node in the first embodiment;

FIG. 3 is a diagram illustrating an exemplary configuration of state information which is included in the distributed ledger of the distributed ledger node in the first embodiment;

FIG. 4A is a diagram illustrating an exemplary configuration of a member management table which is included in a member management node in the first embodiment;

FIG. 4B is a diagram illustrating an exemplary configuration of an organization structure management table which is included in the member management node in the first embodiment;

FIG. 12A is a diagram illustrating an exemplary configuration of the blockchain which is included in the distributed ledger of the distributed ledger node in the first embodiment;

FIG. 12B is a diagram illustrating an exemplary configuration of the state information which is included in the distributed ledger of the distributed ledger node in the first embodiment;

FIG. 22B is a diagram illustrating an exemplary configuration of the state information which is included in the distributed ledger of the distributed ledger node in the second embodiment.

DETAILED DESCRIPTION OF THE EMBODIMENTS

First Embodiment

Figure 1A:
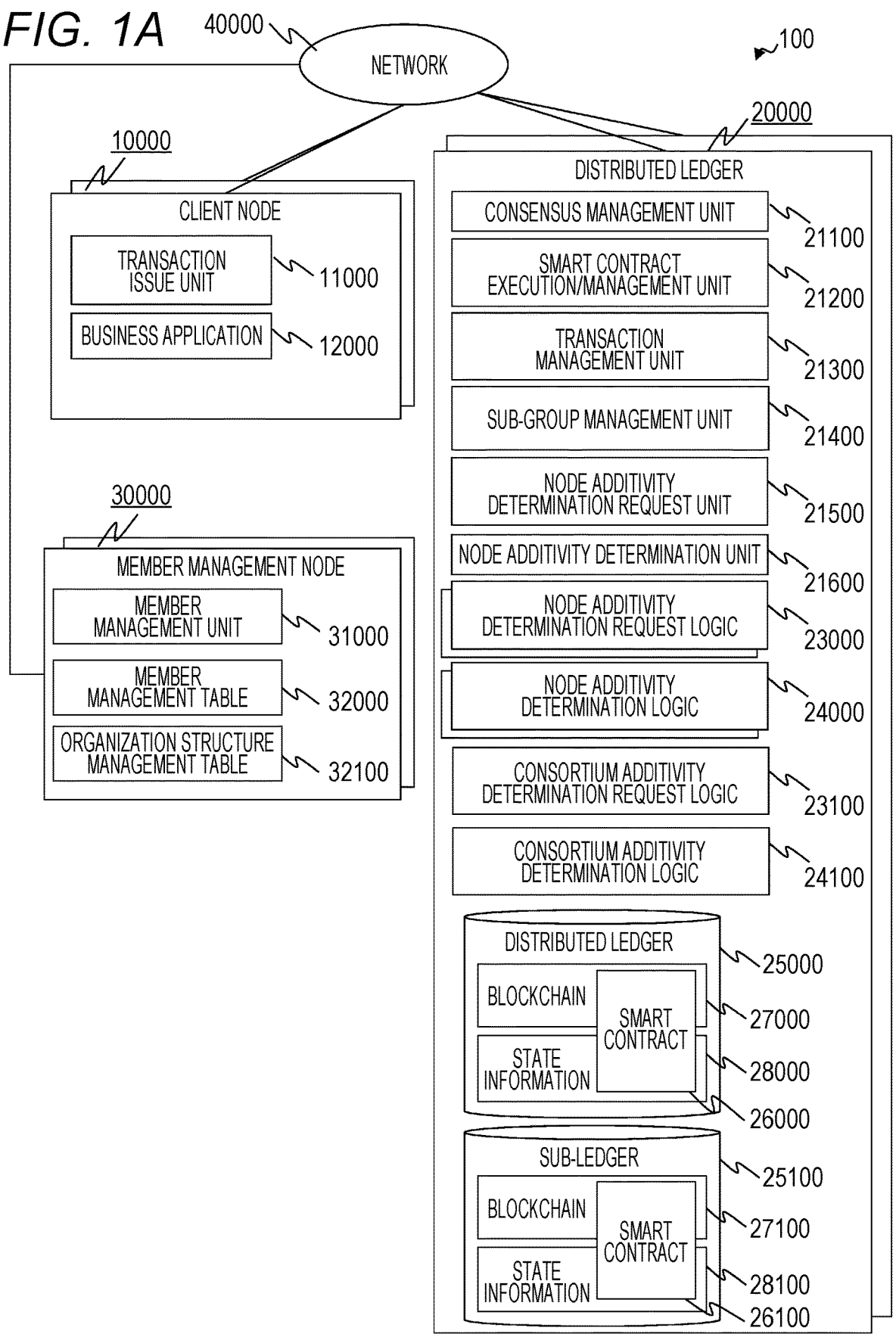
FIG. 1A is a diagram illustrating an exemplary configuration of an organization management support system in a first embodiment.
Figure 1B:
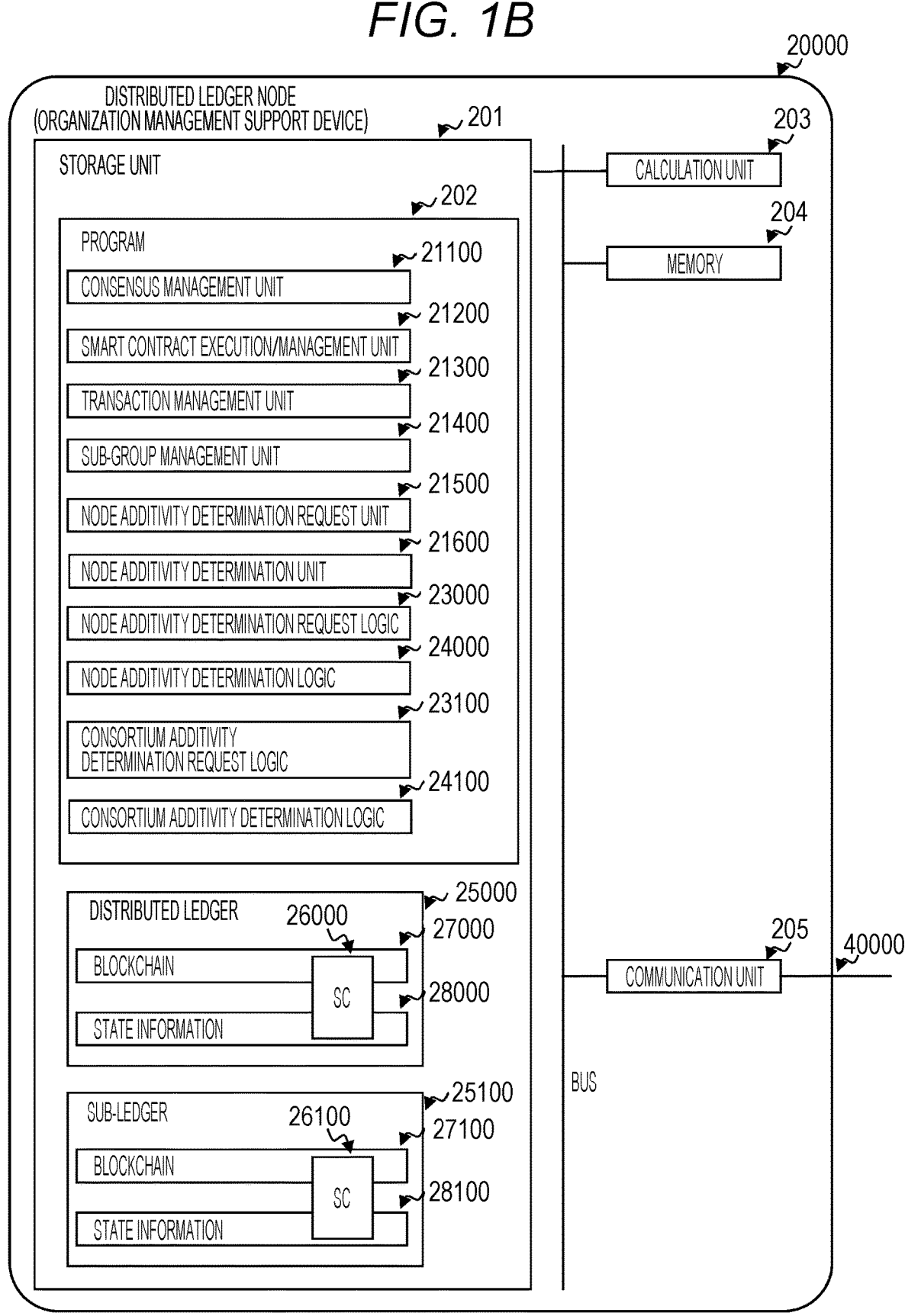
FIG. 1B is a diagram illustrating an exemplary configuration of a distributed ledger node (organization management support apparatus) in the first embodiment.

FIG. 1A illustrates a configuration of an organization management support system in a first embodiment, and a configuration of a node connected to the organization management support system. In addition, FIG. 1B illustrates an exemplary configuration of a distributed ledger node 20000 as an organization management support apparatus in the first embodiment. In addition, FIGS. 2 to 4 illustrate information which is provided in each node.

An organization management support system 100 in the first embodiment is configured by one or more client nodes 10000, one or more distributed ledger nodes 20000, and one or more member management nodes 30000. These devices are connected to a network 40000 through a physical communication line.

In addition, in this embodiment, it is assumed that a plurality of the distributed ledger nodes 20000 are provided, the distributed ledger node is managed by a plurality of organizations which form a consortium.

Similarly, it is assumed that a plurality of the client nodes 10000 are also provided, and the organizations use separate client nodes.

In addition, the member management node 30000 may also be provided in plural. The plurality of member management nodes may coexist while sharing the same information. Therefore, redundancy at the time of failure occurred in a node may be secured.

Alternatively, groups of one or a plurality of organizations may be provided under the consortium, and the member management node may be differently used for each group. In a case where there is a plurality of member management nodes, each distributed ledger node is assumed to have setting information indicating to which member management node is to be accessed. In addition, the function and the data of the member management node may be secured in the distributed ledger node.

Further, as illustrated in the configuration of a distributed ledger 25000 of FIG. 1B, physical subjects of the client node 10000, the distributed ledger node 20000, and the member management node 30000 are a general calculator in which a storage unit 201 configured by a non-volatile memory, a calculation unit 203 such as a CPU which executes a program 202 held in the storage unit 201 to mount a necessary function, a memory 204 in which a primary storage region required at the time of calculation, and a communication unit 205 which accesses the network 40000 to perform a necessary communication process are connected by a data bus.

In addition, the client node 10000 illustrated in FIG. 1A is configured by a transaction issue unit 11000 which issues a transaction (hereinafter, TX) as a processing result of a predetermined business to a business network in a distributed ledger system, and a business application 12000.

The business application 12000 is an application which receives an input of information related to a user's ordering or shipping of a component. The business application 12000 issues TX through the transaction issue unit 11000, and transmits a transaction history of the above component to the distributed ledger node 20000.

Further, the TX is assigned with issuer information. As the issuer information, an organization ID and a node ID which are pre-assigned by the member management node 30000 in an association with the organization, and authentication information (private key) issued for every node by the member management node 30000. In any case, the handling itself of such TX is similar to the existing distributed ledger system.

In addition, the distributed ledger node 20000 is configured by a consensus management unit 21100, a smart contract execution/management unit 21200 (hereinbelow, also referred to as SC execution/management unit), a transaction management unit 21300, a sub-group management unit 21400, a node additivity determination request unit 21500, a node additivity determination unit 21600, a node additivity determination request logic 23000, a consortium additivity determination request logic 23100, a node additivity determination logic 24000, a consortium additivity determination logic 24100, the distributed ledger 25000, and a sub-ledger 25100.

Among them, the node additivity determination request logic 23000 and the node additivity determination logic 24000 are defined at every sub-group, and share the same logic among the nodes belonging to the sub-group.

Further, these logics may be defined as a smart contract (hereinafter, referred to as SC) on the sub-group. In addition, the same logic may be used for the entire consortium.

In addition, the consortium additivity determination request logic 23100 and the consortium additivity determination logic 24100 are defined respectively for the entire consortium. The consortium additivity determination request logic 23100 and the consortium additivity determination logic 24100 will be described in a second embodiment.

In addition, the distributed ledger node 20000 receives TX through the function of the transaction management unit 21300, makes an agreement together with the other nodes on whether TX is received through the function of the consensus management unit 21100, performs an SC deployment and a deployed SC through the function of the SC execution/management unit 21200 for which the agreement is confirmed, and records the TX history and the execution result in the distributed ledger 25000.

In addition, the transaction management unit 21300 of the distributed ledger node 20000 provides a function/interface to receive TX or to acquire/view the TX history information in response to a request from each node such as the client node 10000.

Each of the distributed ledger 25000 and the sub-ledger 25100 stores and manages smart contracts 26000 and 26100 related to business and the TX results obtained through SC.

As a data structure of the TX result, it is assumed in this embodiment that the TX history is set as blockchain 27000 and 27100, and state information 28000 and 28100 based on the execution result of TX is held in a table format.

On the other hand, the member management node 30000 is configured by a member management unit 31000, a member management table 32000, and an organization structure management table 32100.

The member management unit 31000 provides a new registration and an authentication function to a member (that is, organization) who participates in the consortium. In addition, the member management unit manages a sub-group to which each organization belongs. Further, it is assumed that the distributed ledger system of this embodiment controls the authentication of a participating organization, a signature to TX, and an SC execution authority using a pair of a private key and a public key. Key information of each organization is stored and managed on the member management table 32000.

In addition, when receiving TX, the transaction management unit 21300 of the distributed ledger node 20000 checks whether a TX issuer is an authorized participant who has authority through a function of the member management unit 31000 of the member management node 30000.

FIGS. 2 and 3 are examples of the data structure which is stored in the distributed ledger 25000 of the distributed ledger node 20000.

FIG. 2 illustrates an example of the blockchain 27000 which is one of the data structures managed on the distributed ledger 25000. In the distributed ledger management using BC, a plurality of TXs are collected as blocks, and each block has a hash value of the previous block to connect and manage data in series managed.

According such a management, if the value of the block of the previous stage is changed even by 1 bit, the hash values of all the subsequent blocks are changed. Therefore, it is possible to make alteration hard. Further, in order to simplify the explanation in this embodiment, one block is assigned to one TX. However, the invention may be applied to even a case where a plurality of TXs are collected and stored in one block.

Blocks 27010 to 27040 in FIG. 2 form a series of blocks. Each block contains deployment of SC, execution, and any TX information. In addition, each block includes a hash value 27100 of the previous block, and includes a hash value 27200 which is generated from the state information (described below). With the above data structure, the deployment of SC and the execution are managed as a series of data in BC.

The block 27010 among the above blocks is an example of the blocks which stores a deployed TX of SC. The deployment TX 27300 of this embodiment includes a contract ID to uniquely identify a contract, and a logic (for example, an executable binary) of the contract. In addition, there is included a contract input specification which is used by a user to grasp a function name and an argument of the contract.

In this example, as the function name of SC having a "component ordering" ID, "ordering", "shipping", and "history reference" are defined. A logic of each function is defined. In addition, there are included a sub-group ID associated with the SC, and a node ID belonging to the sub-group.

Further, an issuer ID of the deployment of TX and an electronic signature used to verify that the data is not changed. The electronic signature is generated using the private key issued by the member management unit 31000 of the member management node 30000, and can be verified by the public key which is paired with the private key. In addition, there is included an ID which is a unique identifier of TX.

In addition, a block 27020 is an example of a block which stores the execution TX of SC. An execution TX 27400 of this embodiment includes the contract ID of the contract (calling target), and the information of the function name and the argument of the contract (calling target).

In this example, a function "ordering" of SC having an "component ordering" ID is called. There are six arguments including an ordering organization ID, a contract organization ID, a statement number, a model number, an ordering date, and a due date which are indicated with the values "Org1", "Org3", "101", "MNF-1", "2018/5/1", and "2018/5/20".

Further, an issuer ID of TX and an electronic signature used to verify that the data is not changed. Further, not only the issuer but also the information of a node related to the agreement may also be managed/held. In addition, there is included an ID which is a unique identifier of TX.

FIG. 3 illustrates the state information 28000 which is managed on the distributed ledger 25000. In the distributed ledger management using BC, normally, BC is traced in order to acquire the last state (for example, an account balance in the case of virtual currency). By the way, since the process is not efficient in this case, there is a method of caching the last state information separately from BC ("Hyperledger Fabric", online, retrieved on Jun. 30, 2018, Internet <URL:http://hyperledger-fabric.readthedocs.io/en/latest/>).

Even in this embodiment, it is assumed that the last state information is held. In this embodiment, a data region of the state is prepared for each function of the contract. The state information contains an ID 28010 which is an identifier of the contract, a subject 28020 of the contract, and an identifier 28300 of the sub-group associated with the contract.

With this configuration, the SC execution/management unit 21200 can acquire and perform the subject of the contract using the contract ID and the function name as keys. In addition, the state information 28000 includes an internal table 28040 to store the execution result of SC.

TX is performed, or the content of the internal table 28040 is updated whenever a participation node to the sub-group associated to the corresponding SC is increased. The internal table 28040 of the state information 28000 is divided into tables of "transaction history" and "participation node" as illustrated in the components 28040 to 28050 in the state information 28000 of FIG. 3, and is overwritten with information designated by the argument of TX at any time.

In addition, FIG. 4A is a diagram illustrating an exemplary configuration of the member management table 32000 of the member management node 30000.

The member management table 32000 includes items such as a field 32010 to register an identifier in the distributed ledger infrastructure of the organization participating in the consortium, a field 32020 to register the name of the organization, and a field 32030 to register the public key in a case where the organization performs authentication through the member management unit 31000.

In addition, FIG. 4B is a diagram illustrating an exemplary configuration of the organization structure management table 32100 of the member management node 30000.

The organization structure management table 32100 includes items such as a field 32110 to register an identifier in the distributed ledger infrastructure of the organization participating in the consortium, a field 32120 to register an identifier of a node belonging to the organization, a field 32130 to register an identifier of the sub-group belonging to the node, and a field 32140 to register whether the node is a representative node in the sub-group belonging thereto. The representative node will be described in the second embodiment.

Figure 5:
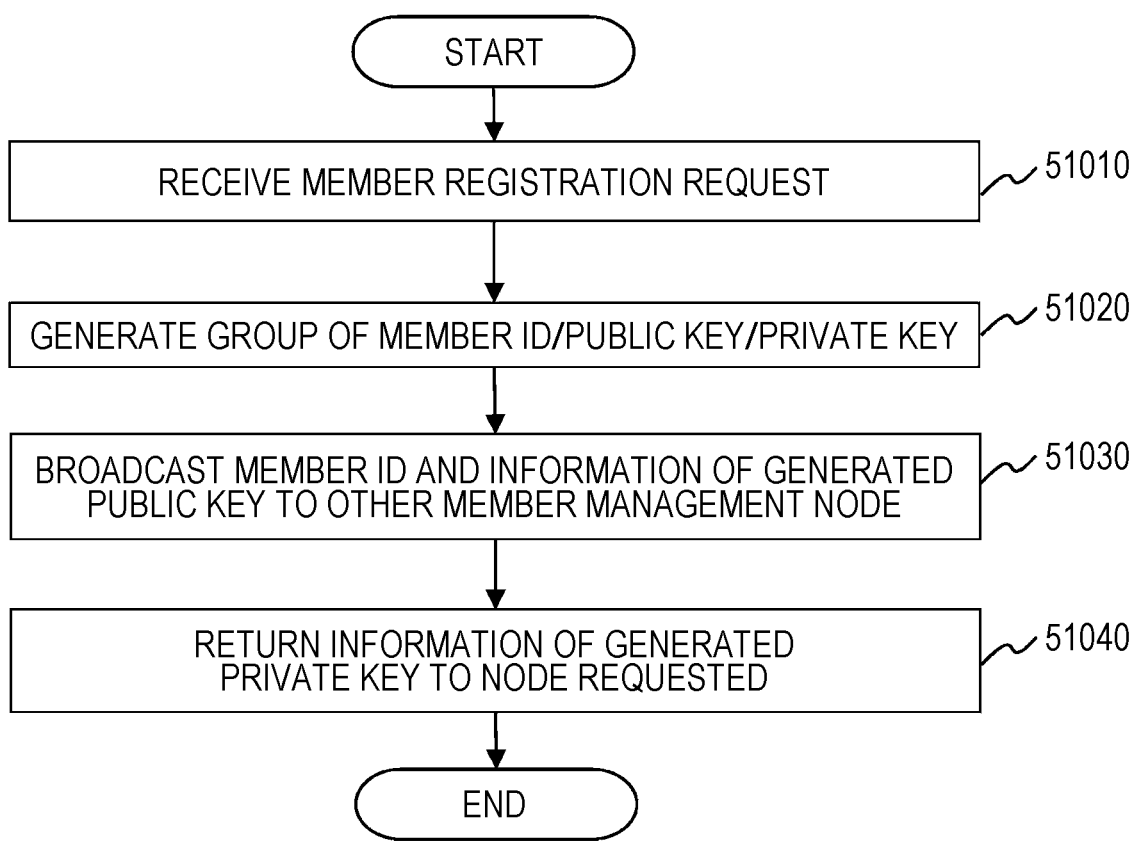
FIG. 5 is a flowchart illustrating an example of the entire flow of a member new registration process which is performed by the member management node in the first embodiment.

In the following, the processing flow in the first embodiment will be described. FIG. 5 is a flowchart illustrating an example of a new registration process of a member who participates in a consortium.

In this case, the member management unit 31000 of the member management node 30000 receives a member registration request from the client node of an organization which does not participate in the consortium (step 51010). In addition, when receiving the member registration request, the member management unit 31000 assigns a member ID for uniquely identifying the organization of a participation request to a predetermined rule.

Next, the member management unit 31000 generates a set of the private key and the public key, associates the member ID to the set to be registered in the member management table 32000 (step 51020). Next, the member management unit 31000 broadcasts the member ID (new registration target) and the public key to the other member management node (step 51030). Herein, the broadcasted information of the member ID and the public key is held in the member management table 32000 on each member management node.

Further, the member management unit 31000 returns the private key generated in step 51020 to the client node of the organization which issues the member registration request (step 51040). In this way, the client node of the organization received the private key holds the private key as its own private key.

In this embodiment, it is assumed that the authentication of the consortium participation member, the signature to TX, the SC execution authority are controlled using a pair of the private key and the public key generated as above.

Specifically, for example, the distributed ledger node 20000 issues TX which is electronically signed by the previously-issued private key, and the node verifying the corresponding TX verifies the electronic signature using the public key on the member management node 30000, so that the identity verification can be realized. Further, as for a method of generating a set of the public key and the private key and a method of verifying the signature, a well-known technology may be applied, and the detailed description will be omitted in this first embodiment.

Further, this embodiment is described on the assumption that the plurality of member management nodes 30000 share the information of the member ID and the public key, but the member management node may be single.

Figure 6:
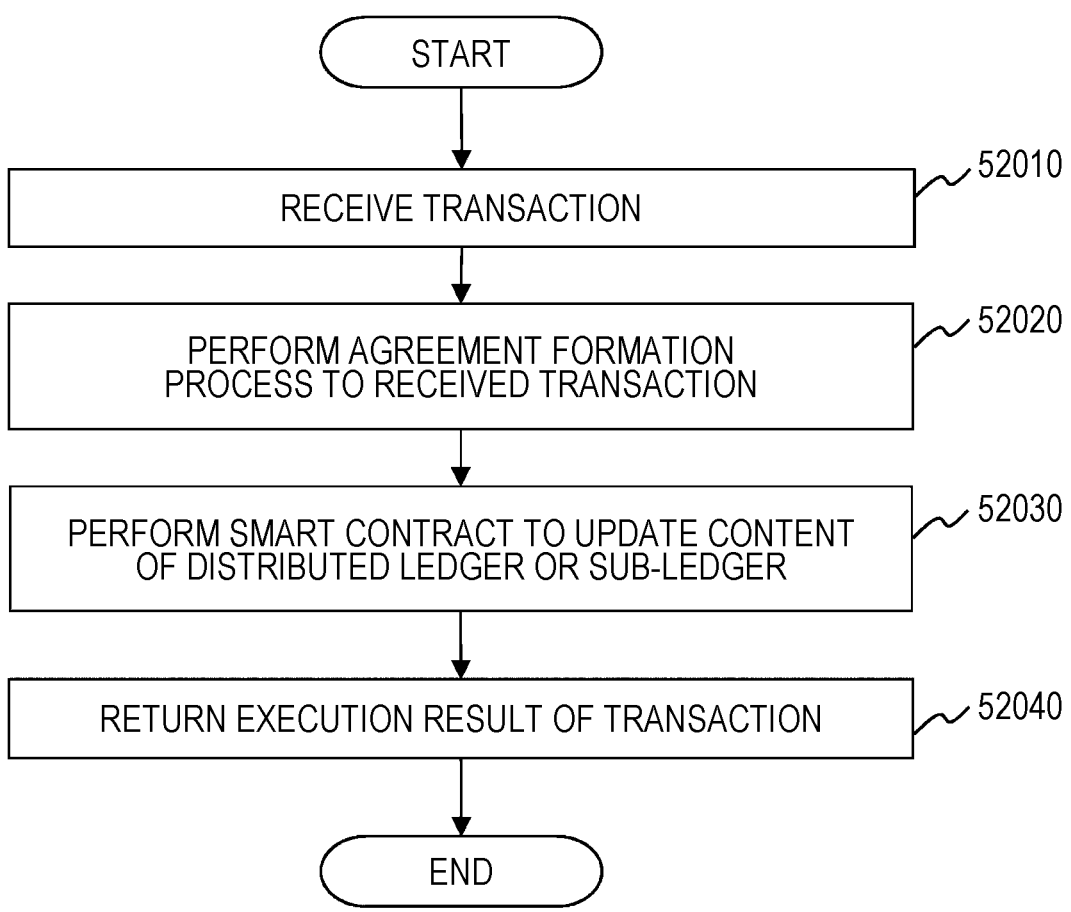
FIG. 6 is a flowchart illustrating an example of the entire flow of a transaction execution process which is performed by the distributed ledger node in the first embodiment.

Subsequently, FIG. 6 is a flowchart illustrating an example of the TX execution process (that is, the deployment of SC and the execution).

In this case, when receiving TX from a TX issuer such as the client node (step 52010), the transaction management unit 21300 of the distributed ledger node 20000 assigns an ID to TX and delivers the received TX to the consensus management unit 21100.

The consensus management unit 21100 performs an agreement formation process with the other distributed ledger node to determine whether the received TX is performed (that is, the received TX is added to BC as a block) (step 52020).

As a specific method of the agreement formation process, a well-known technology may be applied. Specifically, for example, an algorithm called Practical Byzantine Fault Tolerance (PBFT) may be employed. The PBFT is an algorithm which has a condition of an agreement of a certain number or more (⅔) nodes among the nodes participating in the agreement.

Making a simple explanation on the agreement formation based on the PBFT, the distributed ledger node first broadcasts the received TX to all the distributed ledger nodes participating in the network, verifies the signature of TX at each distributed ledger node to check whether there is a change or a correctness of the TX content, and broadcasts the checked result to the other distributed ledger nodes.

In a case where a certain number or more distributed ledger nodes are passed the check, the fact that an approval preparation on TX is completed is broadcasted to the other distributed ledger nodes. Then, after the approval preparation on a certain number or more distributed ledger nodes is completed, the agreement is completed.

As described above, after the agreement is completed, the transaction management unit 21300 registers TX to the distributed ledger 25000 or the sub-ledger 25100 through the SC execution/management unit 22000 (step 52030). Hereinbelow, the description will be given about that the TX content is reflected on the distributed ledger 25000.

In a case where the TX content relates to the deployment of SC, the contract ID and the contract subject are registered as the state information 28000 on the distributed ledger, and a block containing the TX is added to the tail of the blockchain 27000.

In a case where the TX content relates to the execution of a function defined in SC, a calling function and an input argument designated in TX are assigned to SC which has the contract ID designated in TX to execute the function. Then, the content of the distributed ledger 25000 is updated on the basis of the result.

In other words, the state information 28000 related to this contract is updated on the basis of the execution result, and the execution TX is added as a block of the tail of the blockchain 27000.

At this time, the addition of the block is performed even in the other distributed ledger nodes which share the same ledger. In a case where the TX content relates to the setting change of the SC, the setting information related to this contract defined in the state information 28000 is updated, and the execution TX is added as a block of the tail of the blockchain 27000.

Finally, the transaction management unit 21300 returns the execution result of the deployment TX to the TX issuer (step 52040).

Hitherto, this embodiment has been described about a case where the distributed ledger 25000 is updated, but the similar method may be applied even to a case where the sub-ledger 25100 is updated. In this case, the agreement formation process is performed even among the sub-group participation nodes defined in SC.

Further, the broadcasting process in step 52030 is performed by the distributed ledger node 20000 in this embodiment, but may be performed by an independent node which is specified to the broadcasting process. In addition, a means for making an agreement may be performed by a method other than the PBFT.

Figure 7:
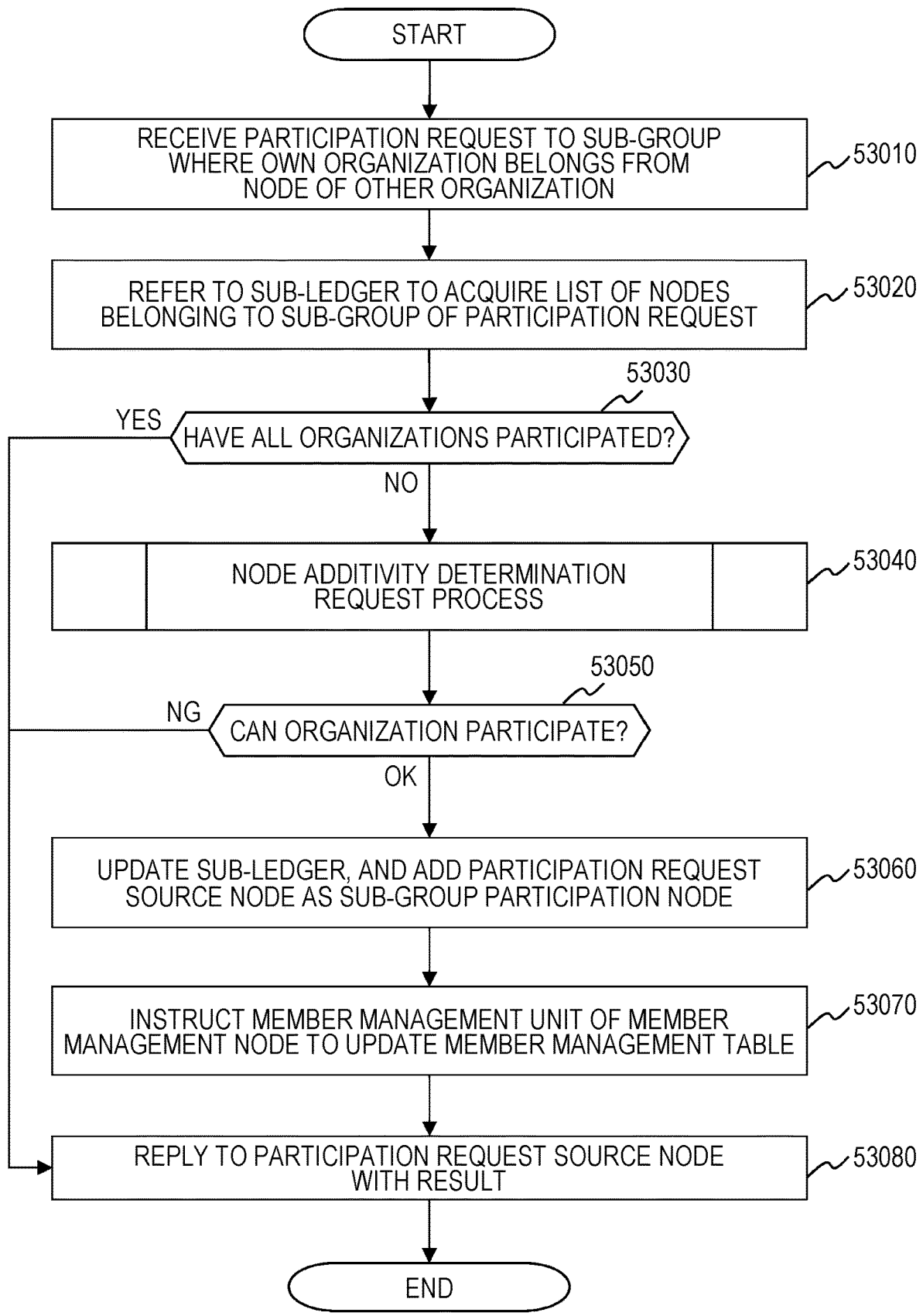
FIG. 7 is a flowchart illustrating an example of the entire flow of a sub-group participation node addition process which is performed by the distributed ledger node in the first embodiment.

Subsequently, FIG. 7 is a flowchart illustrating an example of the internal process of the sub-group management unit 21400 of the distributed ledger node 20000. A specific internal process is as follows.

The sub-group management unit 21400 receives a participation request to the sub-group to which the own organization belongs from a node which belongs to the other organization different from the own organization (step 53010).

In this case, the sub-group management unit 21400 refers participation node data to the belonging sub-group which is defined in the state information 28100 on the sub-ledger 25100, and refers to a list of the participation nodes (step 53020). In a case where a participation request source node already exists in the participation node list (step 53030: Yes), the participation request source node is replied with the result, and the process ends.

On the other hand, in a case where the participation request source node does not exist in the participation node list (step 53030: No), the sub-group management unit 21400 requests a sub-group additivity determination of the participation request source node from the node additivity determination request unit 21500 (step 53040).

As a result, in a case where the determination of participation NG is notified from the node additivity determination request unit 21500 (step 53050: NG), the sub-group management unit 21400 replies with the result to the participation request source node, and the process ends.

On the other hand, in a case where the determination of participation OK is notified (step 53050: OK), the sub-group management unit 21400 updates the state information 28100 on the sub-ledger 25100, and adds the participation request source node as a sub-group participation node (step 53060).

Next, the sub-group management unit 21400 updates the organization structure management table 32100 with respect to the member management unit 31000 of the member management node 30000, and issues an instruction to add the participation request source node as a sub-group participation node (step 53070).

Finally, the sub-group management unit 21400 replies with the completion of the sub-group addition to the participation request source node (step 53080), and the process ends.

Figure 8:
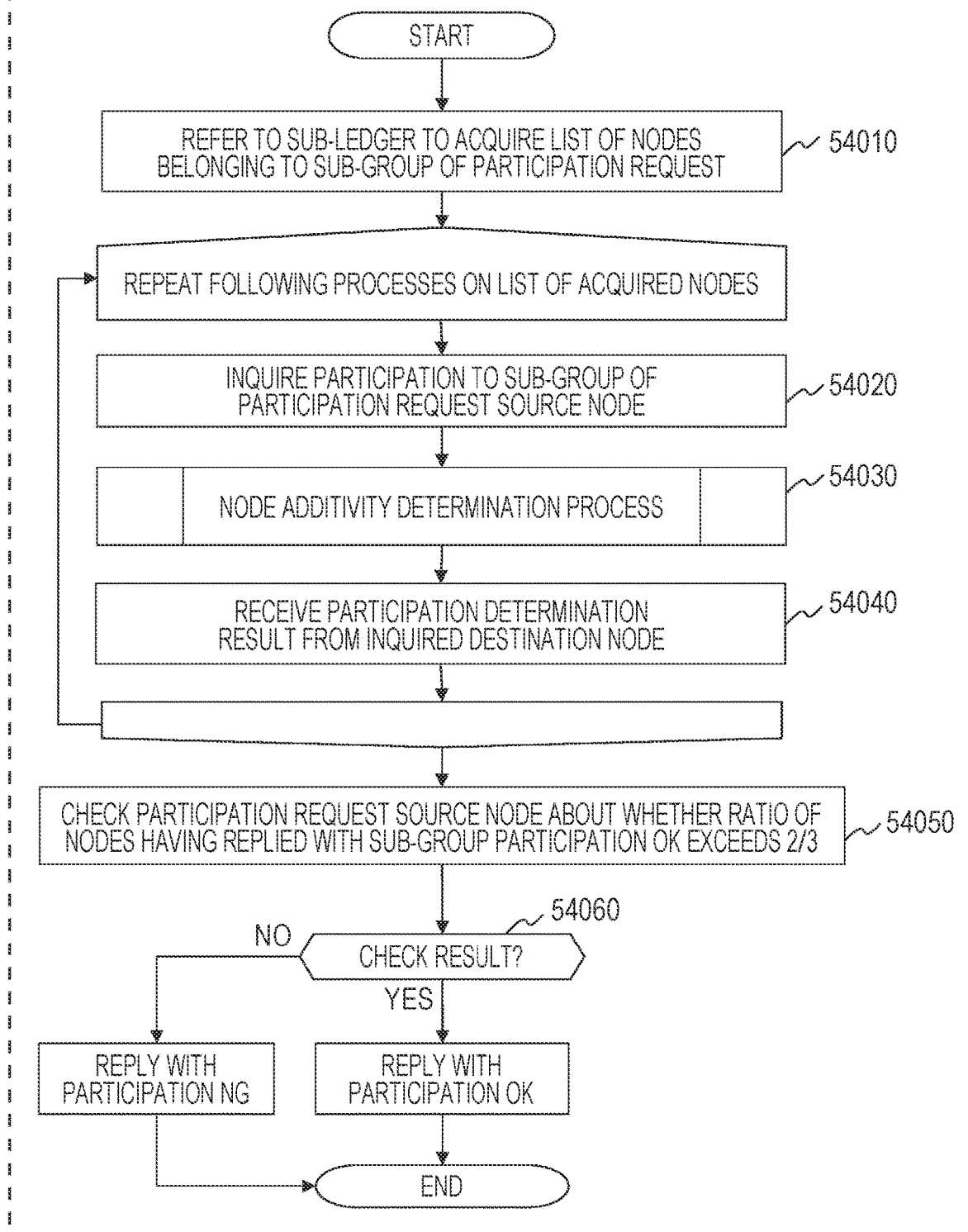
FIG. 8 is a flowchart illustrating an example of the entire flow of a node additivity determination request process which is performed by the distributed ledger node in the first embodiment.

Further, the details of step 53040 in the above flow are illustrated as an example of the flow of FIG. 8. FIG. 8 is a flowchart illustrating an example of the internal process which is performed by the node additivity determination request unit 21500 of the distributed ledger node 20000 on the basis of the node additivity determination request logic 23000 shared among the nodes in Group 1. A specific internal process is as follows.

In this case, first, the node additivity determination request unit 21500 refers to the participation node data to the belonging sub-group which is defined in the state information 28100 on the sub-ledger 25100, and refers to a list of the participation nodes (step 54010).

The node additivity determination request unit 21500 repeatedly performs the following processes on the node which is defined in the list of the participation nodes. First, the node additivity determination unit 21600 of the node is inquired about the participation to the sub-group of the participation request source node (step 54020). The node having received a request performs a node additivity determination process (step 54030). The node requesting the node additivity determination receives a participation determination result from the inquiry destination node (step 54040). Then, the processes of step 54020 to step 54040 are repeatedly performed on all the nodes.

Next, the node additivity determination request unit 21500 collects the responses from the inquiry destination nodes, and checks whether a ratio of the nodes having replied with participation OK in the sub-group to the participation request source nodes exceeds ⅔ of the total nodes (step 54050). As a result of checking, if the ratio of the nodes having replied with participation OK exceeds ⅔ of the total nodes (step 54060: Yes), the node additivity determination request unit 21500 replies with the participation OK of the participation request source node and, if not (step 54060: No), the node additivity determination request unit 21500 replies with the participation NG (step 54060).

Figure 9:
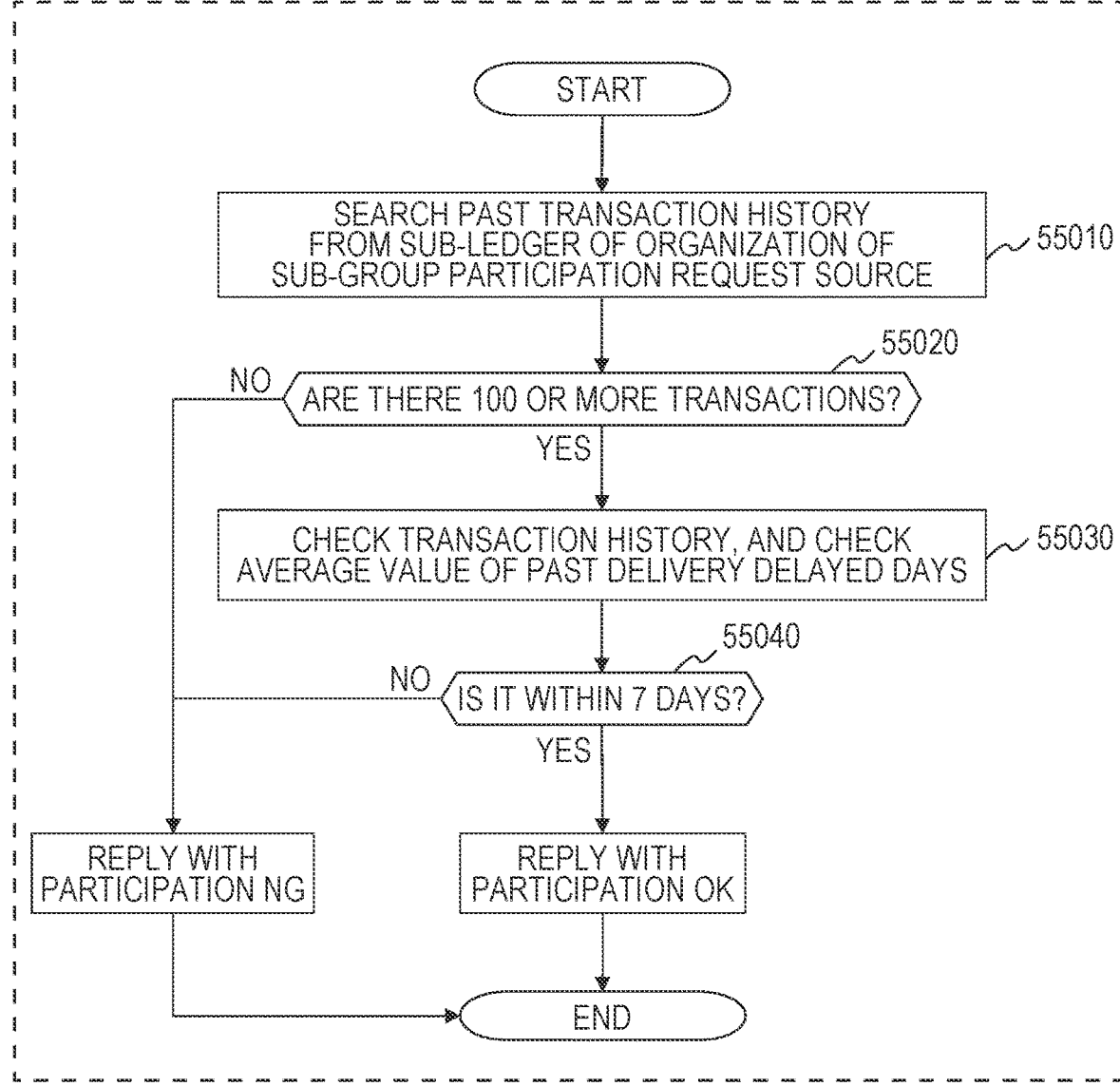
FIG. 9 is a flowchart illustrating an example of the entire flow of a node additivity determination process which is performed by the distributed ledger node in the first embodiment.

Further, the details of step 54030 in the above flow are illustrated as an example of the flow of FIG. 9. FIG. 9 is a flowchart illustrating an example of the internal process which is performed by the node additivity determination unit 21600 of the distributed ledger node 20000 on the basis of the node additivity determination logic 24000 shared among the nodes in Group 1. A specific internal process is as follows.

First, the node additivity determination unit 21600 refers to transaction history data defined in the state information 28100 on the sub-ledger 25100, and refers to a list of the past transactions of the participation request source node (step 55010).

The node additivity determination unit 21600 refers to the list of the past transactions, and checks whether the number of the past transactions exceeds 100 (step 55020).

As a result, in a case where the number of the past transactions exceeds 100 (step 55020: YES), the node additivity determination unit 21600 checks the list of the past transactions, and calculates an average value of the past payment delayed days (step 55030).

As a result of checking, if the average value of the payment delayed days is within 7 days (step 55040: YES), the node additivity determination unit 21600 replies with the participation OK of the participation request source node, and the process ends.

On the other hand, if the number of the past transactions does not exceed 100 (step 55020: NO), or the average value of the payment delayed days exceeds 7 days (step 55040: NO), the node additivity determination unit 21600 replies with the participation NG, and the process ends.

In the following, the description will be given using the schematic views of FIGS. 10 and 11 about that the process of the first embodiment approves the participation request from a node other than the sub-group, and performs a participation procedure.

Figure 10:
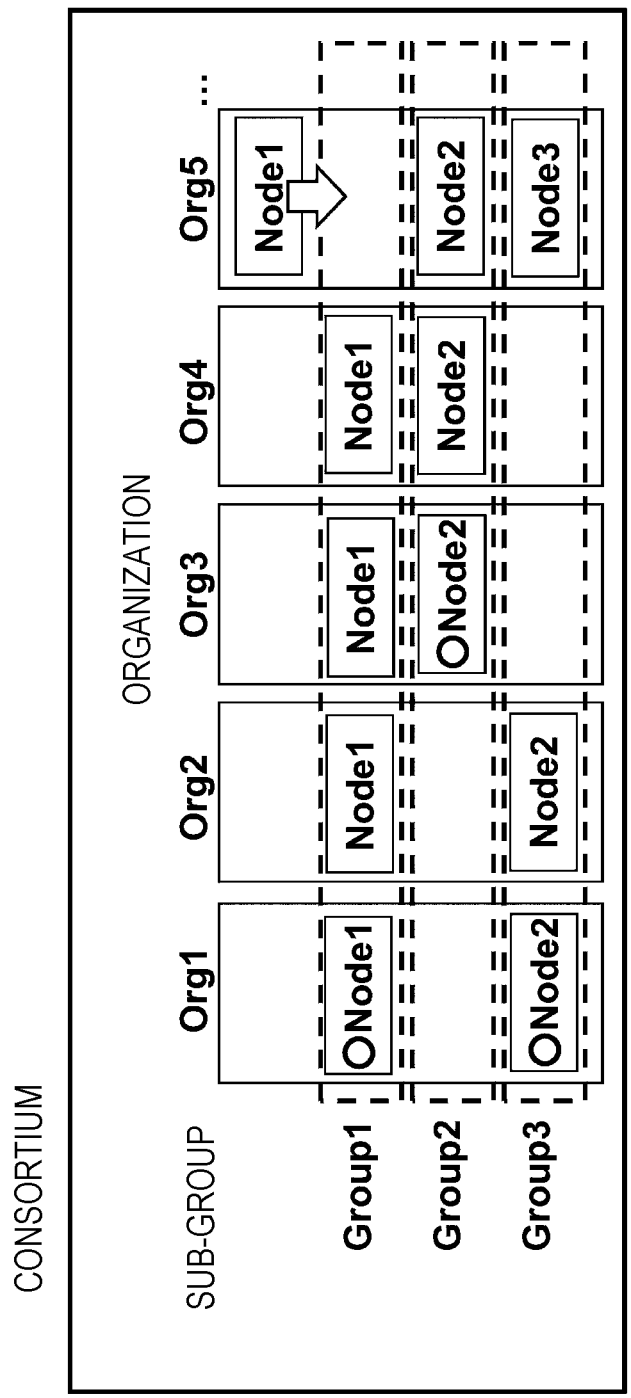
FIG. 10 is a conceptual diagram illustrating an exemplary configuration of a node which forms a calculator system in the first embodiment.

FIG. 10 is a schematic view illustrating a company which participates in the consortium in this embodiment. The consortium is configured by a plurality of participation organizations which include Org1 to Org5.

Each organization includes one or a plurality of distributed ledger nodes. For example, the organization Org1 includes distributed ledger nodes Node1 and Node2.

In addition, a plurality of sub-groups Group1 to Group3 exists in the consortium. The plurality of distributed ledger nodes belongs to each of the sub-groups. For example, the distributed ledger node Node1 of the organization Org1, the distributed ledger node Node1 of the organization Org2, the distributed ledger node Node1 of the organization Org3, and the distributed ledger node Node1 of the organization Org4 belong to the sub-group Group1.

Figure 11:
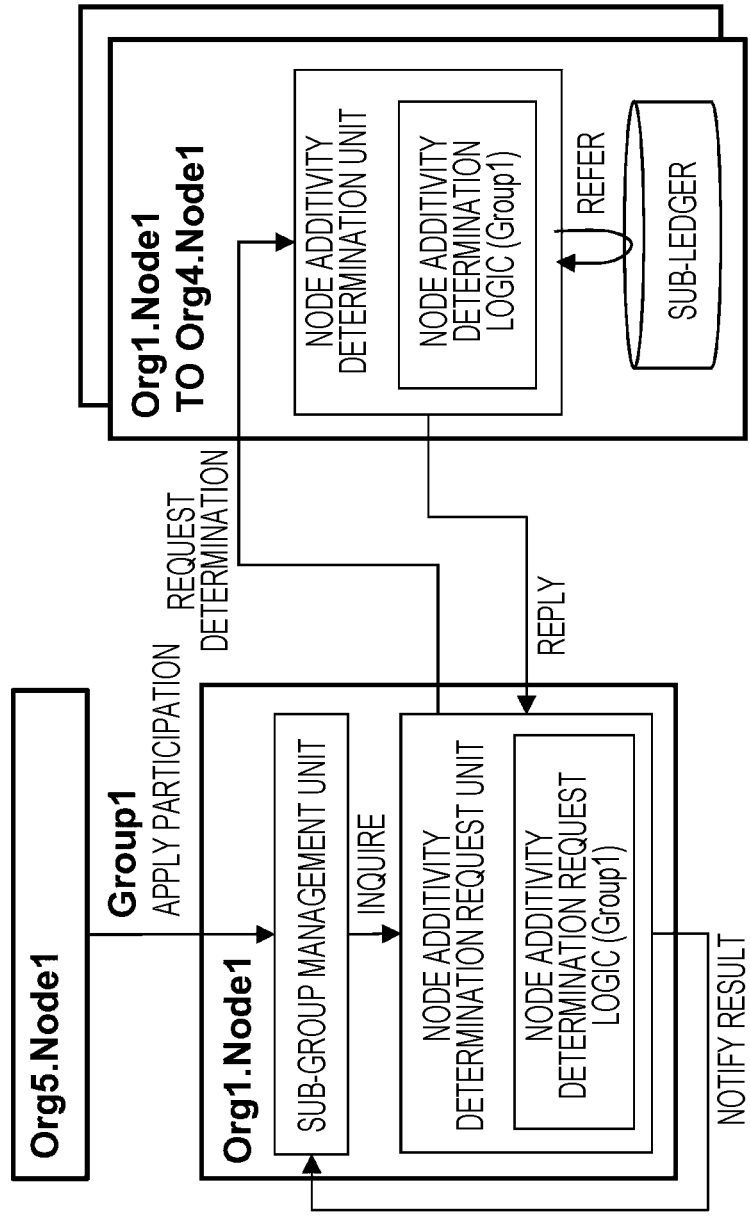
FIG. 11 is a conceptual diagram illustrating an example of the sub-group participation node addition process performed by a node which forms the calculator system in the first embodiment.

FIG. 11 is a schematic view illustrating a procedure that the nodes exchange information described in FIGS. 1A to 9. Hereinbelow, the description will be given about a procedure that Node1 of the organization Org5 desires to participate in Group1, issues a participation request to a group in Group1 (for example, Node1 of the organization Org1) and approves the participation.

First, the sub-group management unit 21400 of Org5/Node1 issues the participation request to Group 1 to the sub-group management unit 21400 of Org1/Node1. Then, the sub-group management unit 21400 of Org1/Node1 refers to the participation node data of Group1 defined in the state information 28100 on the sub-ledger 25100, and checks that Org5/Node1 does not exist in the participation node list.

Next, the sub-group management unit 21400 of Org1/Node1 requests the sub-group additivity determination of the participation request source node from the node additivity determination request unit 21500.

The node additivity determination request unit 21500 of Org1/Node1 refers to the participation node data to the belonging sub-group which is defined in the state information 28100 on the sub-ledger 25100, and refers to the list of the participation nodes. Then, the nodes of Org1/Node1, Org2/Node1, Org3/Node1, and Org4/Node1 defined in the participation node list each are inquired about the participation to the sub-group of Org5/Node1.

The node additivity determination unit 21600 of each node having received the request performs the node additivity determination process. First, the transaction history data defined in the state information 28100 on the sub-ledger 25100 is referred, and the list of the past transactions of the participation request source node is referred.

As a result, in a case where the number of the past transactions exceeds 100, the list of the past transactions is further checked to calculate an average value of the past payment delayed days.

As a result of checking, in a case where the average value of the payment delayed days is within 7 days, it is replied that the participation OK to Group1 of Org5/Node1 is possible.

The node additivity determination request unit 21500 of Org1/Node1 requesting the node additivity determination receives the participation determination result from the nodes of Org1/Node1, Org2/Node1, Org3/Node1, and Org4/Node1.

Next, the node additivity determination request unit 21500 collects the responses from the inquiry destination nodes, and checks whether the ratio of nodes having replied with participation OK in Group1 of Org5/Node1 exceeds ⅔ of the total nodes.

As a result of checking, if the ratio of the nodes having replied with participation OK exceeds ⅔ of the total nodes, the sub-group management unit 21400 is replied with that the participation to Group1 of Org5/Node1 is possible.

Next, the sub-group management unit 21400 of Org1/Node1 updates the state information 28100 on the sub-ledger 25100, and adds Org5/Node1 as a participation node of Group1.

Next, the member management unit 31000 of the member management node 30000 is instructed to update the member management table 32000, and to add Org5/Node1 as the participation node of Group1. Finally, Org5/Node1 is replied with that the addition of the sub-group is completed, and the process ends.

FIGS. 12A and 12B each are examples of the blockchain 27000 and the state information 28000 which are managed on the distributed ledger 25000. The blocks 27010 to 27050 in FIG. 12A are a series of blocks, and each block contains deployment of component ordering SC, execution, setting change, and any TX information.

The block 27050 among the blocks is an example of the blocks which stores setting change TX of the component ordering SC. In the component ordering SC of this embodiment, the participation node of the sub-group is defined in the deployment TX. However, when the setting change TX is performed, Org5/Node1 is added as a participation node to the internal table of the state information 28000 as illustrated in FIG. 12B.

As described above, with the use of the invention, it is possible to determine whether a new participation of the organization is possible on the agreement among the organizations participating in the sub-group when the participation organization is added to the sub-group. In addition, in a case where an organization outside the consortium tries to participate newly in the sub-group, the organization may request the participation from the consortium or any organization of the sub-group.

Second Embodiment

In the second embodiment, the description will be given about that a node additivity determination request process performed in the first embodiment is performed while referring to the member management table 32000 held on the member management node 30000.

Figure 13:
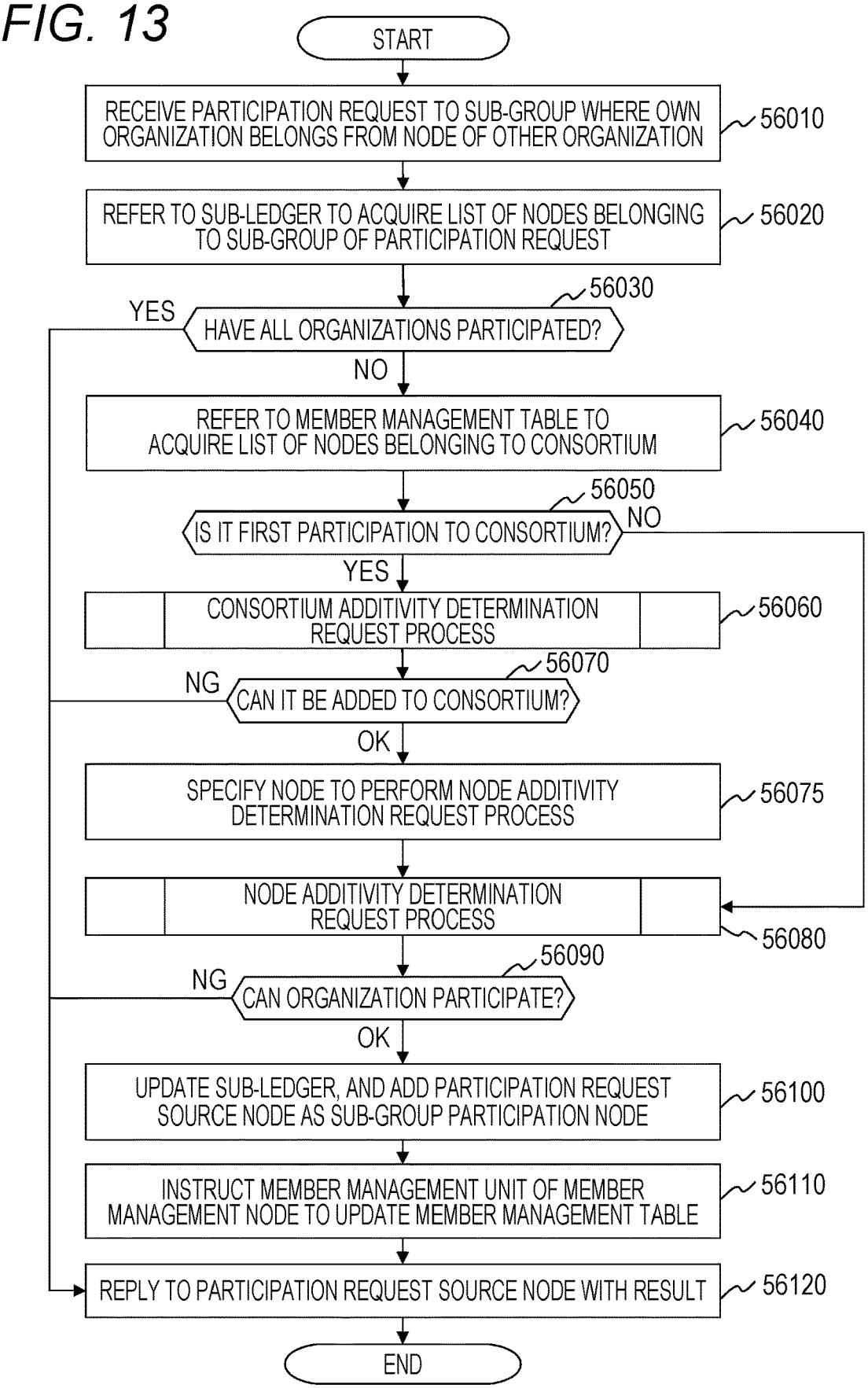
FIG. 13 is a flowchart illustrating an example of the entire flow of the sub-group participation node addition process which is performed by the distributed ledger node in a second embodiment.

FIG. 13 is a flowchart illustrating an example of the internal process of the sub-group management unit 21400 of the distributed ledger node 20000. A specific internal process is as follows.

The sub-group management unit 21400 receives a participation request to the sub-group where the own organization belongs from a node which belongs to an organization different from the own organization (step 56010), refers to the participation node data to the belonging sub-group which is defined in the state information 28100 on the sub-ledger 25100, and refers to the list of the participation nodes (step 56020).

In a case where the participation request source node already exists in the participation node list (step 56030: Yes), the sub-group management unit 21400 replies to the participation request source node with the result, and the process ends.

On the other hand, in a case where the participation request source node does not exist in the participation node list (step 56030: No), the sub-group management unit 21400 acquires the member management table 32000 from the member management unit 31000 of the member management node 30000 to check whether the participation request source node already participates in the consortium (step 56040).

In a case where the participation request source node already exists in the consortium (step 56050: No), the sub-group management unit 21400 proceeds to the process of step 56080.

On the other hand, in a case where the participation request source node does not exist in the consortium (step 56050: Yes), the sub-group management unit 21400 requests the execution of the consortium additivity determination of the participation request source node from the node additivity determination request unit 21500 (step 56060).

As a result, in a case where the determination of participation NG is notified from the node additivity determination request unit 21500 (step 56070: NG), the sub-group management unit 21400 replies with the result to the participation request source node, and the process ends. Further, the portion after step 56080 is equal to the content of the process after step 53040 illustrated in FIG. 7 in the first embodiment.

Next, the sub-group management unit 21400 specifies a node from which the sub-group additivity determination of the participation request source node is requested (step 56075). In this case, the sub-group management unit 21400 issues a request from the node additivity determination request unit 21500 on the own node in a case where the own node belongs to the sub-group where the participation request source node participates. On the other hand, in a case where the own node does not belong to the sub-group where the participation request source node participates, the sub-group management unit 21400 issues a request from the node additivity determination request unit 21500 on any node belonging to the sub-group on the basis of the information of the member management table 32000. In this case, a management node such as the member management node 30000 may determine whether the node additivity determination request unit 21500 on any node in the sub-group.

Figure 14:
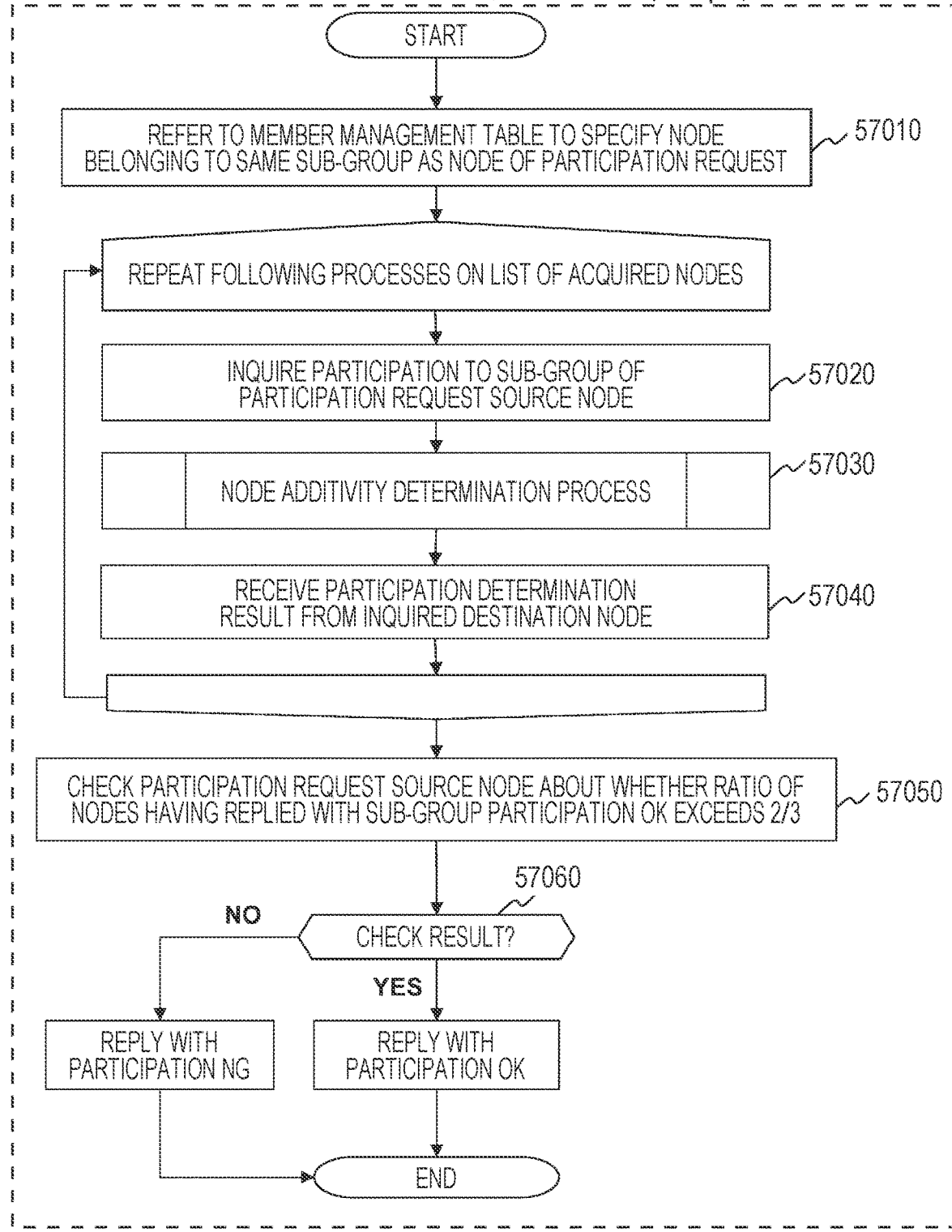
FIG. 14 is a flowchart illustrating an example of the entire flow of the node additivity determination request process which is performed by the distributed ledger node in the second embodiment.

FIG. 14 is a flowchart illustrating an example of the internal process which is performed by the node additivity determination request unit 21500 of the distributed ledger node 20000 on the basis of the node additivity determination request logic 23000 among the nodes in Group 1. A specific internal process is as follows.

First, the node additivity determination request unit 21500 acquires the member management table 32000 from the member management unit 31000 of the member management node 30000, and specifies a node belonging to the same sub-group as the node of the participation request (step 57010).

In addition, the node additivity determination request unit 21500 repeatedly performs the processes after step 57020 on the node specified in step 57010. However, the portion after step 57020 is equal to the content of the process after step 54020 illustrated in FIG. 8 in the first embodiment.

Further, when a node belonging to the same sub-group as the node of the participation request is specified in step 57010, the specification may be realized such that the node additivity determination request unit 21500 inquires of the representative node of each sub-group about the participation node of each group.

In addition, in steps 57010 to 57020, the node additivity determination request unit 21500 may specify a node belonging to the same sub-group as the node of the participation request, and may inquire of the representative node of each sub-group instead of inquiring of all the nodes when inquiring about the participation to the sub-group of the participation request source node. In this case, the node additivity determination request unit 21500 collects responses from the representative nodes of the sub-groups, and checks whether the ratio of the nodes having replied with participation OK to the sub-group with respect to the participation request source nodes exceeds ⅔ of the total nodes.

Figure 15:
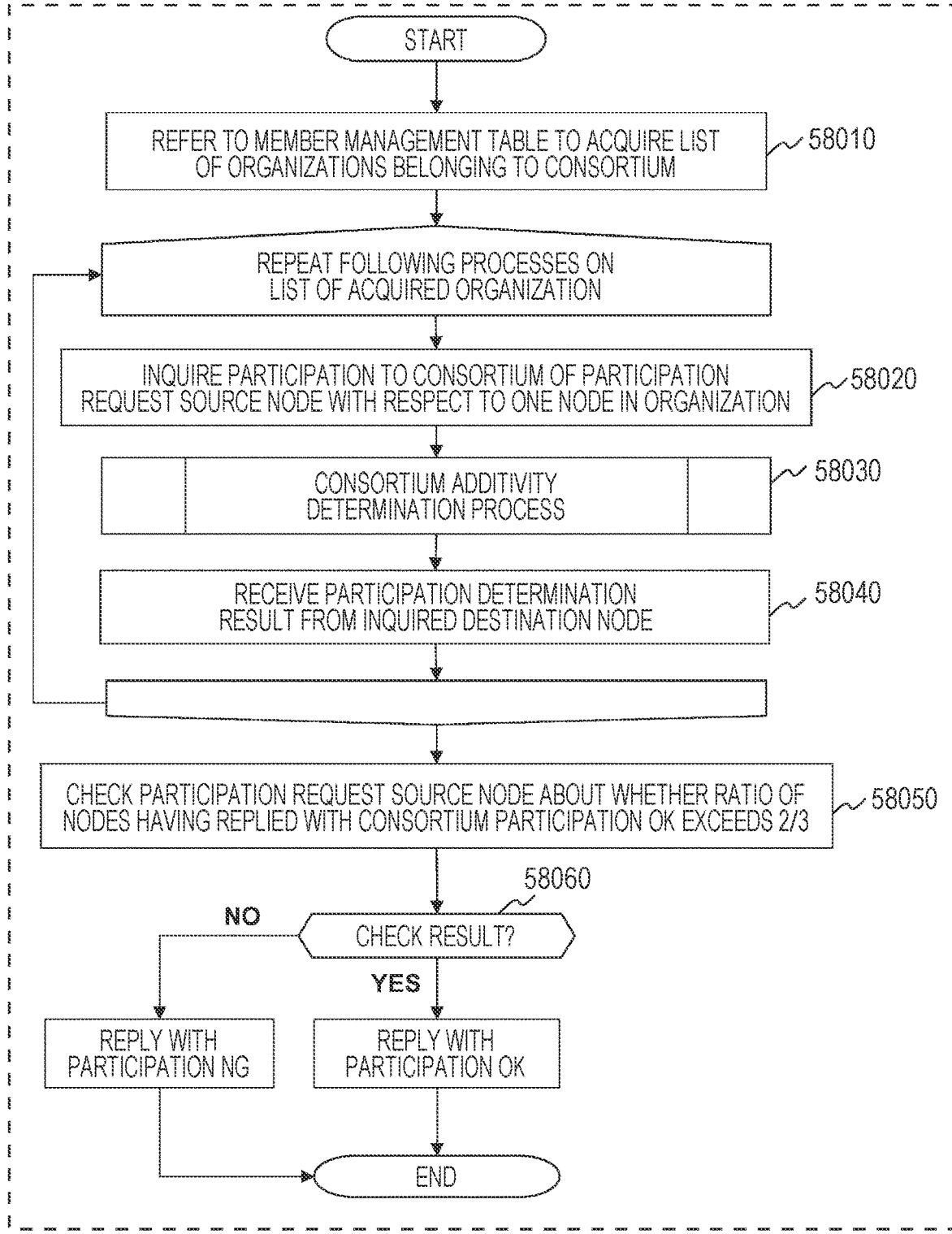
FIG. 15 is a flowchart illustrating an example of the entire flow of the node additivity determination request process to a consortium which is performed by the distributed ledger node in the second embodiment.

FIG. 15 is a flowchart illustrating an example of the internal process which is performed by the node additivity determination request unit 21500 of the distributed ledger node 20000 on the basis of the consortium additivity determination request logic 23100 shared among the nodes in the consortium. A specific internal process is as follows.

First, the node additivity determination request unit 21500 acquires the member management table 32000 from the member management unit 31000 of the member management node 30000, and refers to a list of consortium participation organizations (step 58010).

The node additivity determination request unit 21500 repeatedly performs the following processes on the organization which is defined in the list of the participation organizations.

First, the node additivity determination request unit 21500 selects one node in the organization, and inquires of the node additivity determination unit 21600 about the participation to the consortium of the participation request source node (step 58020). On the other hand, the node having received the inquiry performs the node additivity determination process (step 58030). The node requesting the node additivity determination receives the participation determination result from the inquiry destination node (step 58040). Then, the processes of step 58020 to step 58040 are repeatedly performed on all the nodes.

Next, the node additivity determination request unit 21500 collects the responses from the inquiry destination nodes, and checks whether a ratio of the nodes having replied with participation OK in the consortium to the participation request source nodes exceeds ⅔ of the total nodes (step 58050).

As a result of checking, if the ratio of the nodes having replied with participation exceeds ⅔ of the total nodes (step 58060: Yes), the node additivity determination request unit 21500 replies with the participation OK of the participation request source node and, if not exceeding (step 58060: No), replies with the participation NG (step 58060).

Figure 16:
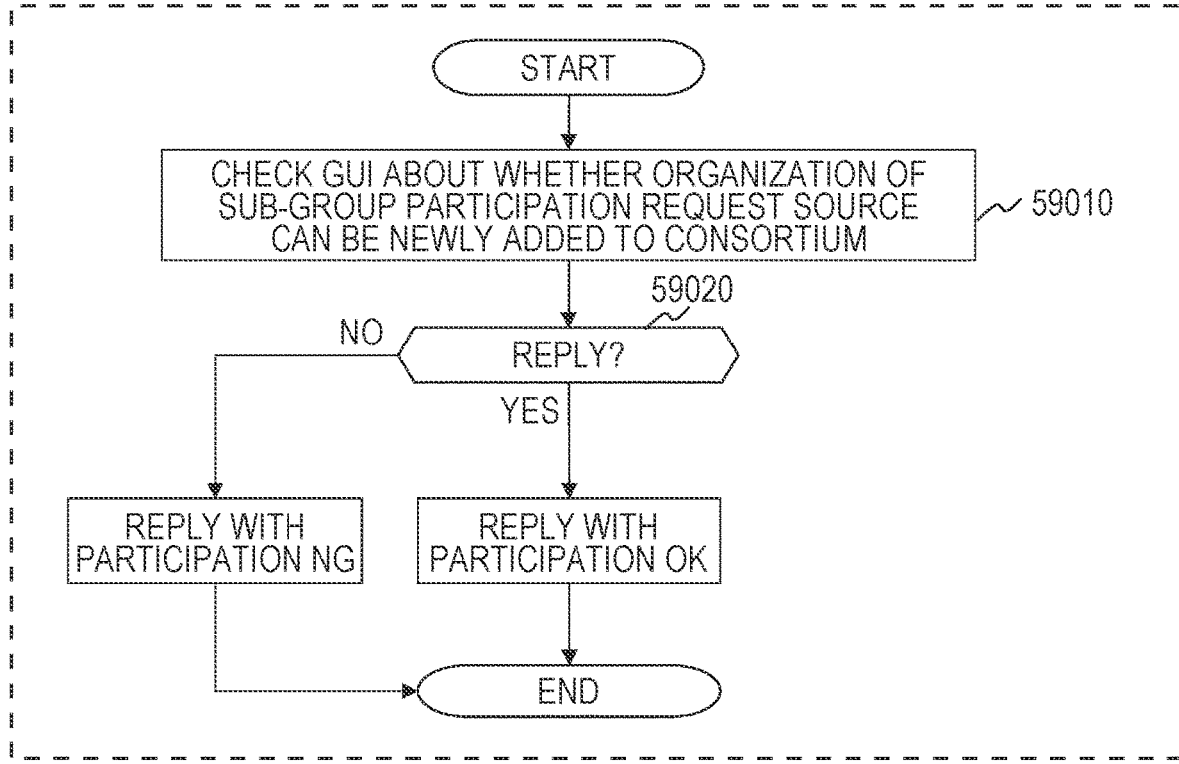
FIG. 16 is a flowchart illustrating an example of the entire flow of the node additivity determination process which is performed by the distributed ledger node in the second embodiment.

Subsequently, FIG. 16 is a flowchart illustrating an example of the internal process which is performed by the node additivity determination unit 21600 of the distributed ledger node 20000 on the basis of the consortium additivity determination logic 24100 shared among the nodes in the consortium. A specific internal process is as follows.

First, the node additivity determination unit 21600 checks whether a distributed ledger node manager can newly add the organization of the participation request source of the sub-group to the consortium on a predetermined GUI (a screen 71000 of FIG. 17) (step 59010).

As a result of checking, if the distributed ledger node manager approves the participation (step 59020: YES), the node additivity determination unit 21600 replies with the participation OK of the participation request source node.

On the other hand, in a case where the distributed ledger node manager does not approve the participation (step 59020: NO), the node additivity determination unit 21600 replies with the participation NG (step 59020), and the process ends.

Figure 17:
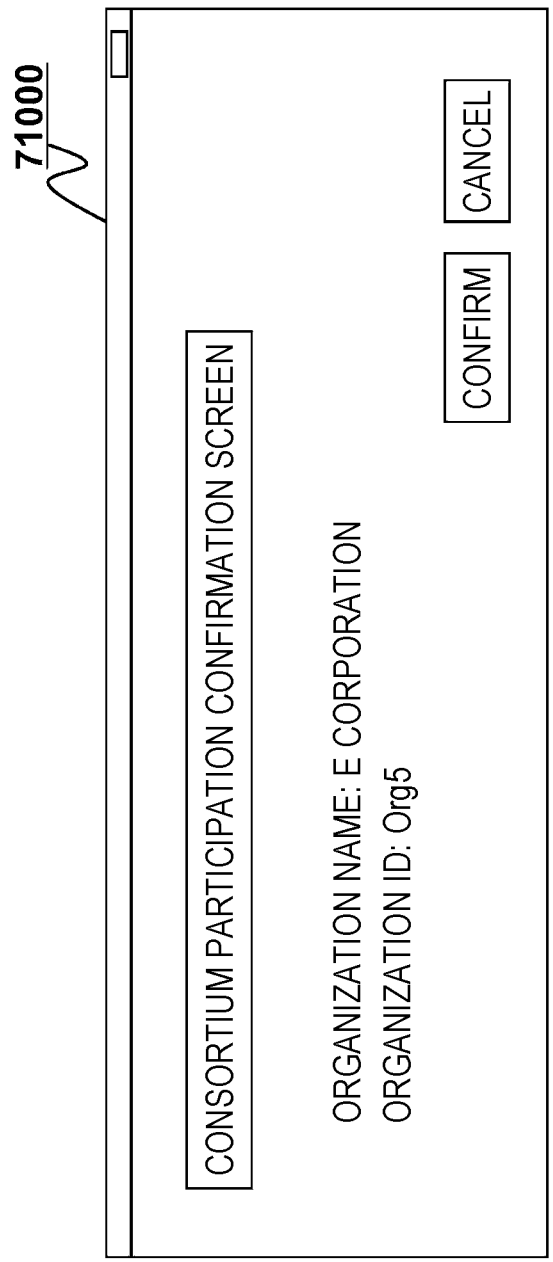
FIG. 17 is a diagram illustrating an example of a new node additivity confirmation screen to a community which is included in the distributed ledger node in the second embodiment.

FIG. 17 is an example of a screen displayed by the node additivity determination unit 21600. In the screen 71000, the name and the ID of the organization which is an addition target to the consortium, "Confirm" and "Cancel" buttons are displayed. The distributed ledger node manager checks the information of the organization (addition target), and can press a corresponding button to reply to the node additivity determination unit 21600.

Figure 18:
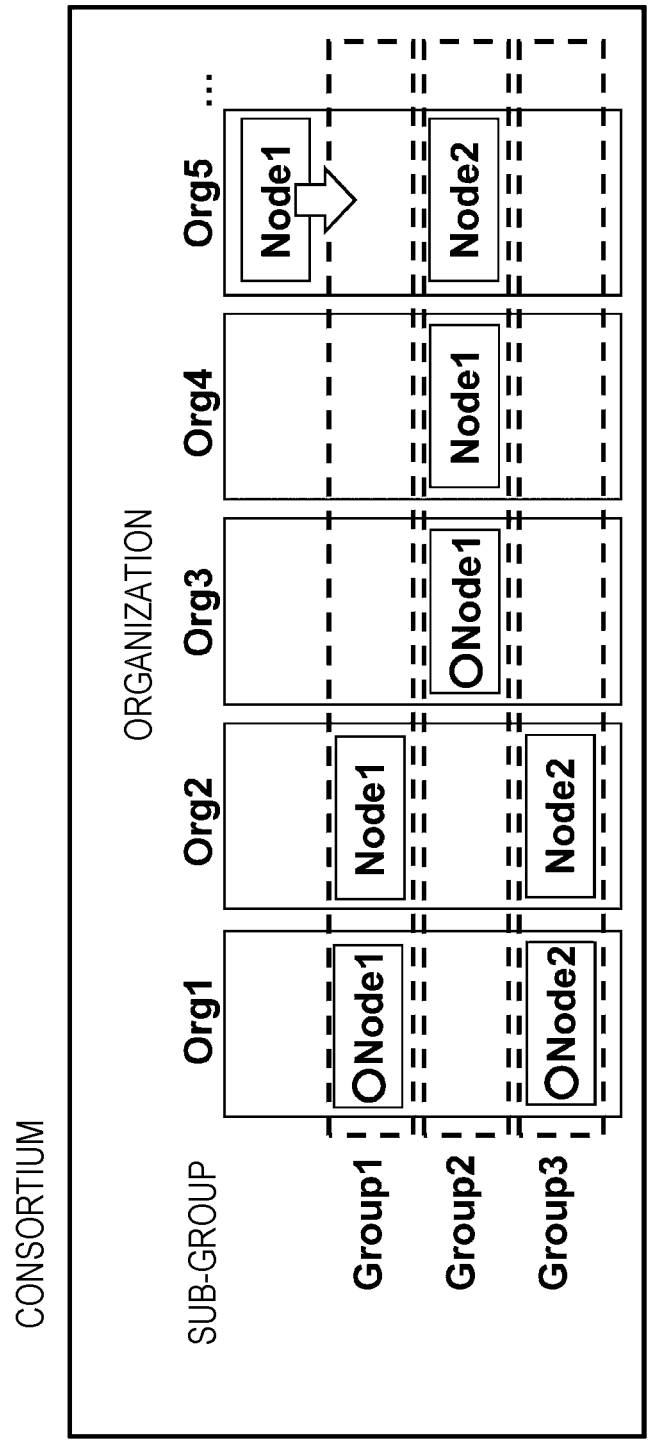
FIG. 18 is a conceptual diagram illustrating an exemplary configuration of a node which forms the calculator system in the second embodiment.

Subsequently, FIG. 18 is a schematic view illustrating a company which participates in the consortium in this embodiment. A plurality of distributed ledger nodes belongs to each sub-group of the consortium. For example, the distributed ledger node Node1 of the organization Org1 and the distributed ledger node Node1 of the organization Org2 belong to the sub-group Group1, the distributed ledger node Node1 of the organization Org3 and the distributed ledger node Node1 of the organization Org4, and the distributed ledger node Node2 of the organization Org5 belongs to Group2, and the distributed ledger node Node2 of the organization Org1 and the distributed ledger node Node2 of the organization Org2 belong to Group3.

Figure 19A:
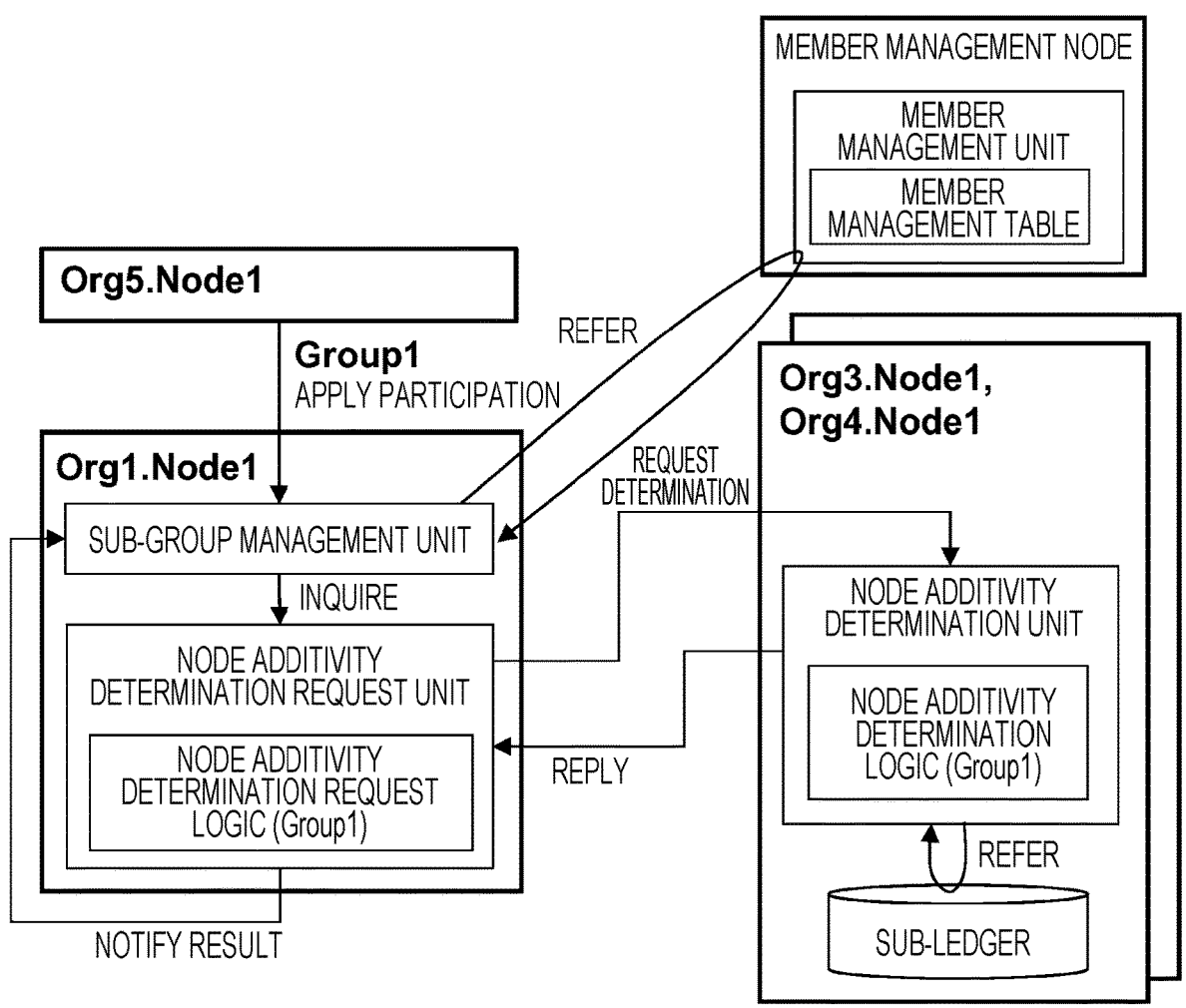
FIG. 19A is a conceptual diagram illustrating an example of the sub-group participation node addition process performed by a node which forms the calculator system in the second embodiment.

In addition, FIG. 19A is a schematic diagram illustrating a procedure that the nodes exchanges the information described in FIGS. 1A to 9. Hereinbelow, the description will be given about a procedure that Node1 of the organization Org5 requires the participation to Group1 from Node1 of the organization Org1 and approves the participation.

First, the sub-group management unit 21400 of Org5/Node1 issues the participation request to Group 1 to the sub-group management unit 21400 of Org1/Node1.

Then, the sub-group management unit 21400 of Org1/Node1 refers to the participation node data of Group1 defined in the state information 28100 on the sub-ledger 25100, and checks that Org5/Node1 does not exist in the participation node list. In addition, the member management table 32000 is acquired from the member management unit 31000 of the member management node 30000, and it is checked that the participation request source node already participates in the consortium.

Next, the sub-group management unit 21400 of Org1/Node1 requests the sub-group additivity determination of the participation request source node from the node additivity determination request unit 21500.

In this case, the own node belongs to the sub-group (Group1) where the participation request source node participates. Therefore, a request may be issued to the node additivity determination request unit 21500 on the own node. The node additivity determination request unit 21500 Org4/Node1 acquires the member management table 32000 from the member management unit 31000 of the member management node 30000, and specifies a node belonging to the same sub-group as the node of the participation request.

In an exemplary configuration of FIG. 18, the corresponding nodes include each of Org3/Node1 and Org4/Node1. The node additivity determination request unit 21500 inquires of these nodes about the participation to the sub-group of Org5/Node1. The subsequent processes are the same flow as the processes illustrated in FIG. 11.

Figure 19B:
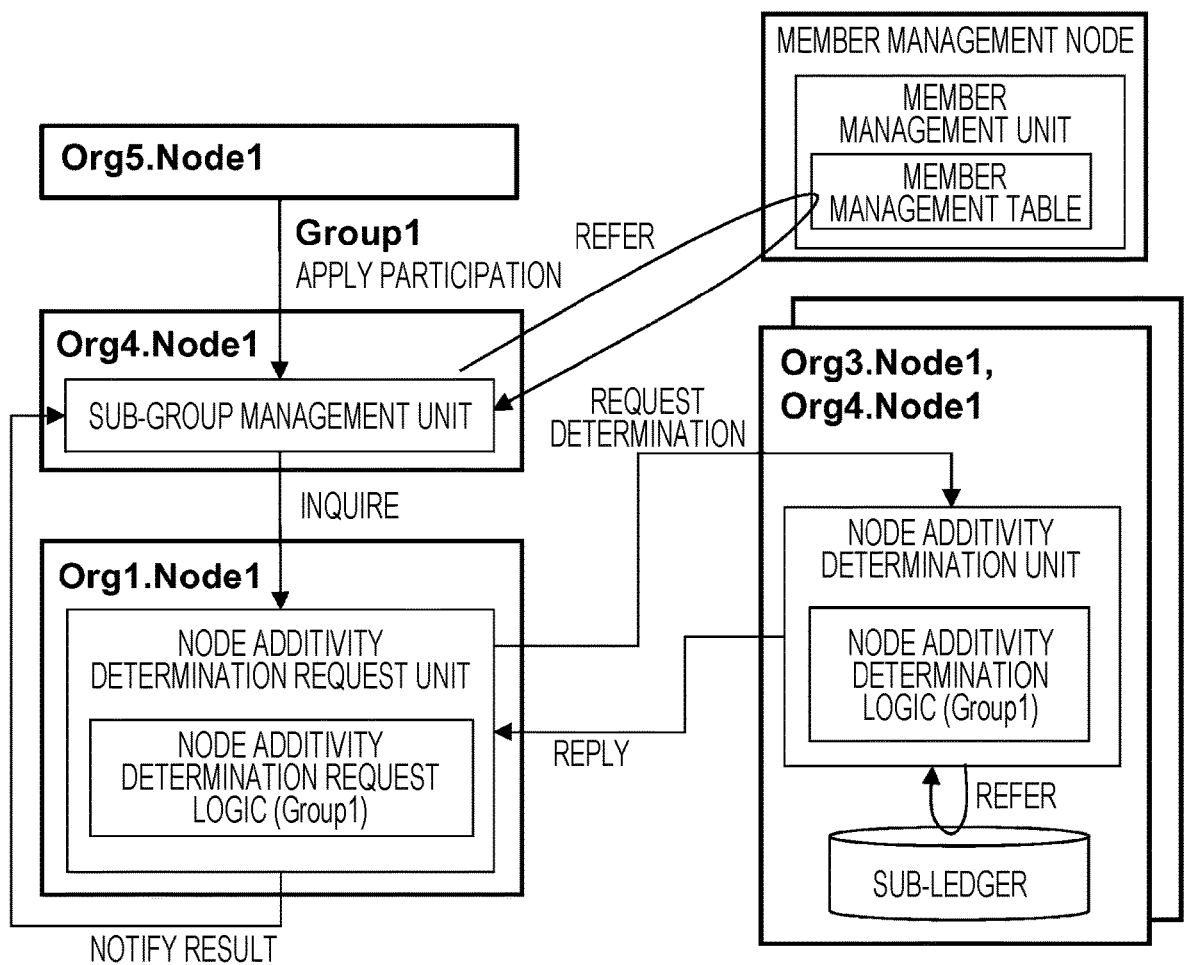
FIG. 19B is a conceptual diagram illustrating an example of the sub-group participation node addition process performed by a node which forms the calculator system in the second embodiment.

On the other hand, in the case of FIG. 19B, Node1 of the organization Org5 requests the participation to Group1 from Node1 of the organization Org4.

In this case, Node1 of the organization Org4 does not belong to the sub-group (Group1) to be participated by the participation request source node. Therefore, the sub-group management unit 21400 of Org4/Node1 requests the sub-group additivity determination of the participation request source node from the node additivity determination request unit 21500 on any node (for example, Org1/Node1) belonging to Group1.

Figure 20:
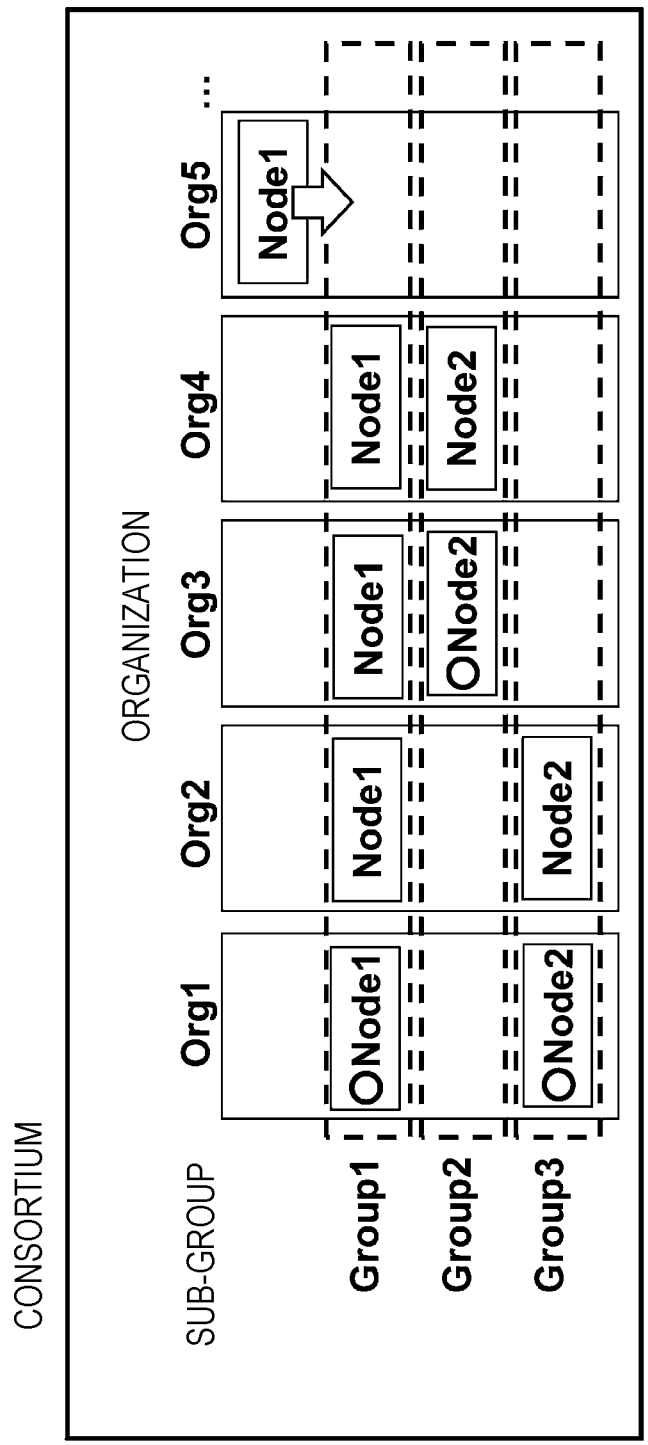
FIG. 20 is a conceptual diagram illustrating an exemplary configuration of a node which forms the calculator system in the second embodiment.

Subsequently, FIG. 20 is a schematic diagram illustrating another form of the company which participates in the consortium in this embodiment. A plurality of distributed ledger nodes 20000 belong to each sub-group of the consortium. For example, the distributed ledger node Node1 of the organization Org1, the distributed ledger node Node1 of the organization Org2, the distributed ledger node Node1 of the organization Org3, and the distributed ledger node Node1 of the organization Org4 belong to the sub-group Group1, the distributed ledger node Node1 of the organization Org3 and the distributed ledger node Node2 of the organization Org4 belong to Group2, and the distributed ledger node Node2 of the organization Org1 and the distributed ledger node Node2 of the organization Org2 belong to Group3.

Figure 21:
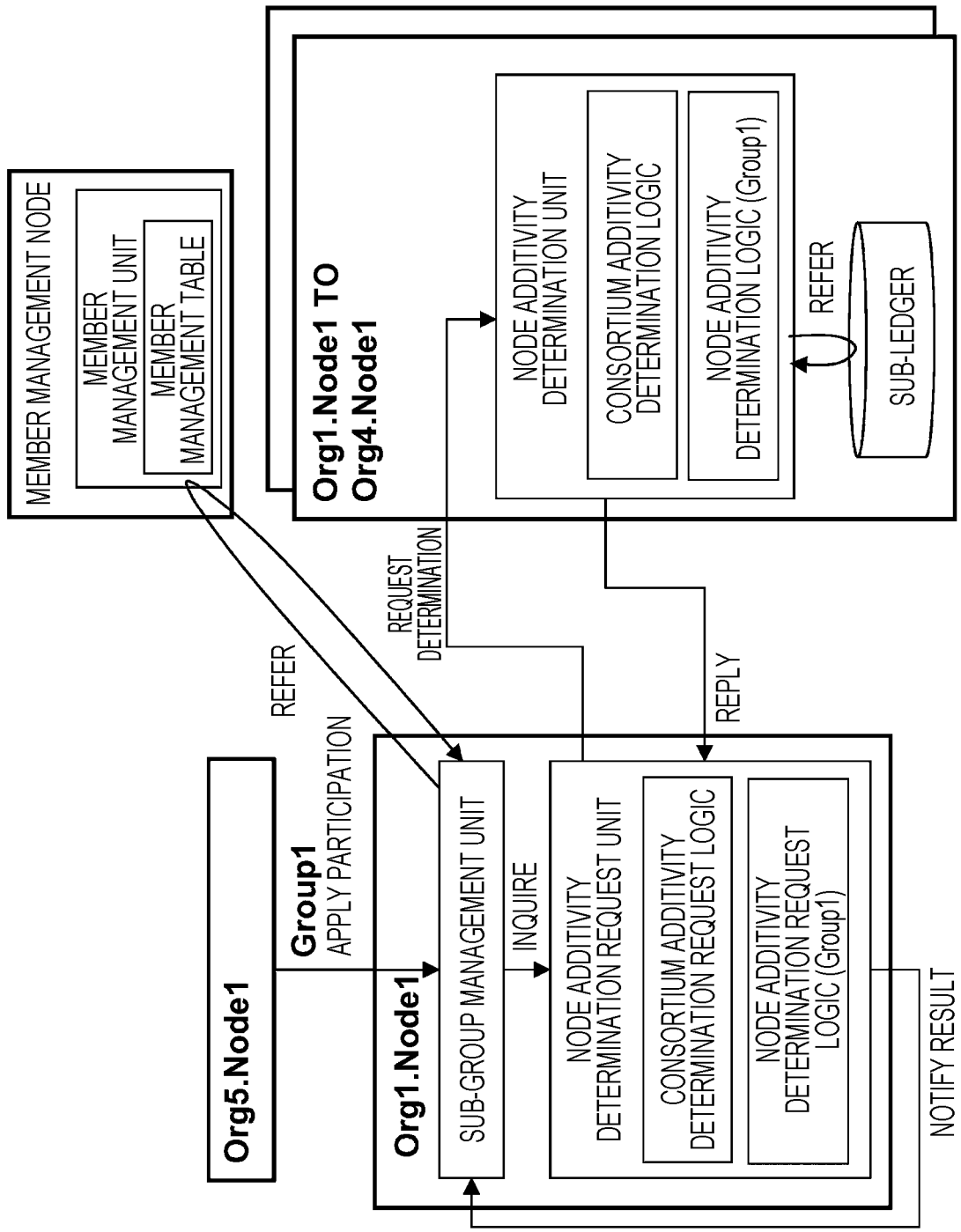
FIG. 21 is a conceptual diagram illustrating an example of the sub-group participation node addition process performed by a node which forms the calculator system in the second embodiment.

In addition, FIG. 21 is a schematic diagram illustrating a procedure that each node exchanges information with the other nodes described in FIGS. 1A to 9. Hereinbelow, the description will be given about a procedure that Node1 of the organization Org5 requires the participation to Group1 from Node1 of the organization Org1 and approves the participation.

First, the sub-group management unit 21400 of Org5/Node1 issues the participation request to Group 1 to the sub-group management unit 21400 of Org1/Node1.

Then, the sub-group management unit 21400 of Org1/Node1 refers to the participation node data of Group1 defined in the state information 28100 on the sub-ledger 25100, and checks that Org5/Node1 does not exist in the participation node list.

In addition, the member management table 32000 is acquired from the member management unit 31000 of the member management node 30000, and it is checked that the participation request source node does not participate in the consortium.

Next, the sub-group management unit 21400 of Org1/Node1 requests the consortium additivity determination of the participation request source node from the node additivity determination request unit 21500.

The node additivity determination request unit 21500 of Org1/Node1 acquires the member management table 32000 from the member management unit 31000 of the member management node 30000, and specifies all the nodes in the consortium. The node additivity determination request unit 21500 selects one node from each organization, and inquires of the node about the participation to the consortium of Org5. Specifically, each of Org1/Node1, Org2/Node1, Org3/Node1, and Org4/Node1 is inquired about the participation to the consortium of Org5.

The node additivity determination request unit 21500 of each node having received the inquiry performs the node additivity determination process. Specifically, in a case where the distributed ledger node manager approves the participation to the consortium of Org5, it is replied with the participation OK.

The node additivity determination request unit 21500 of Org1/Node1 requesting the node additivity determination receives the participation determination result from the nodes of Org1/Node1, Org2/Node1, Org3/Node1, and Org4/Node1.

Next, the node additivity determination request unit 21500 collects the responses from the inquiry destination nodes, and checks whether the ratio of nodes having replied with participation OK in the consortium of Org5 exceeds ⅔ of the total nodes. As a result of checking, if the ratio of the nodes having replied with participation OK exceeds ⅔ of the total nodes, the sub-group management unit 21400 is replied with that the participation to the consortium of Org5 is possible. The subsequent processes are the same as the processes illustrated in FIG. 11.

As described above, with the use of the invention described in the second embodiment, another organization which is able to evaluate a contract abiding ability (reliability) of the organization is appropriately requested for the determination on the participation at the time of adding the participation organization to the consortium or the sub-group. As a result, after the contract abiding ability (reliability) of the addition target organization is evaluated, the organization addition can be performed in a non-centralized manner.

In addition, in a case where an organization outside the consortium tries to newly participate in the consortium or the sub-group, the organization may request the participation from any organization of the consortium. In addition, the existing participant in the consortium does not need to disclose a role of each organization in the consortium or the sub-group to the organization which tries to participate for the first time.

Further, the first and second embodiments have been described such that the member management node 30000 manages the sub-group in the member management table 32000 and a correspondence relation of the participation nodes. However, the correspondence relation may be managed by being distributed in the distributed ledger 25000 on the distributed ledger node.

Figure 22A:
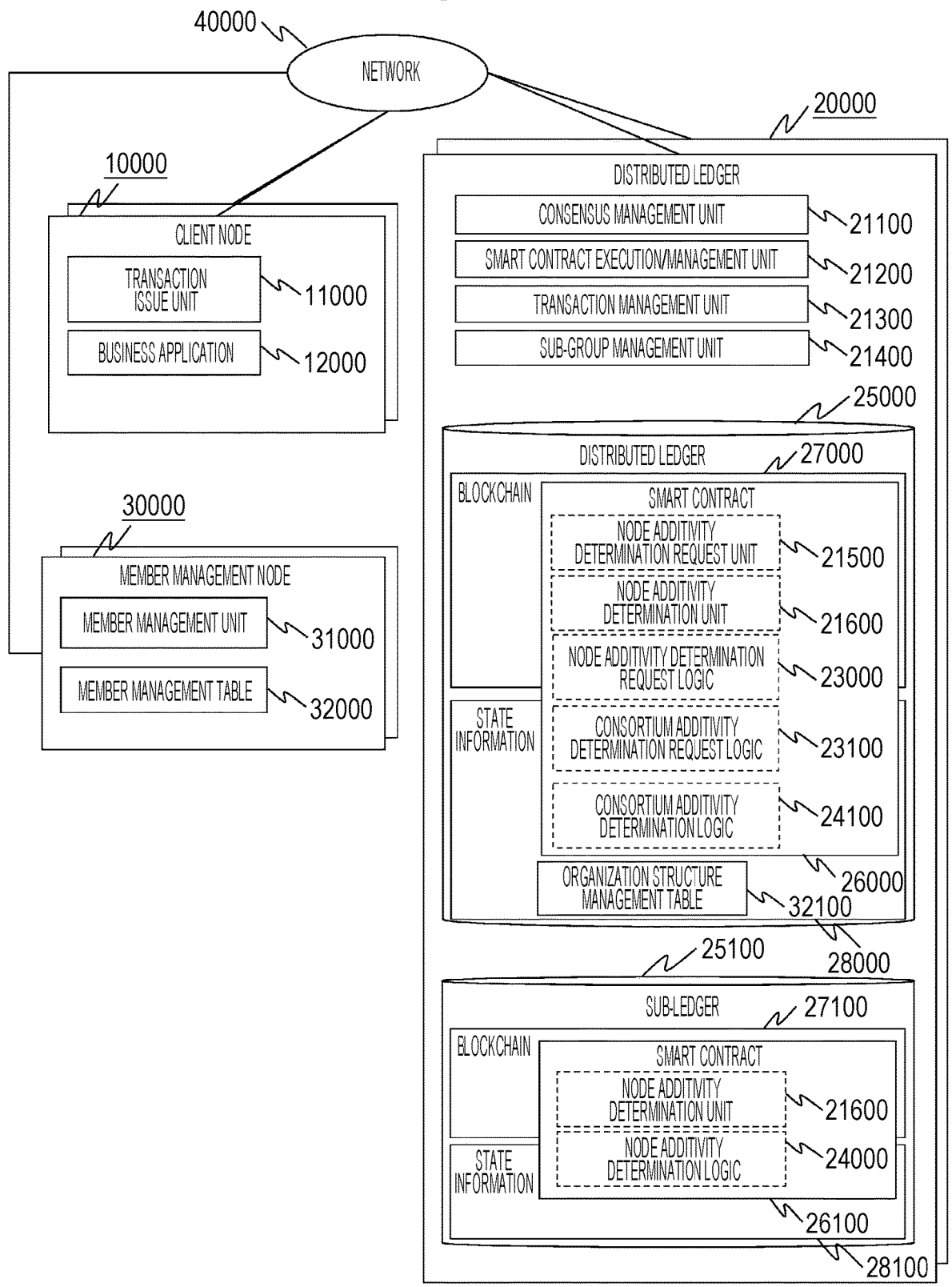
FIG. 22A is a diagram illustrating an exemplary configuration of the calculator system in the second embodiment.

FIG. 22A schematically illustrates an exemplary computer system. In this case, the distributed ledger node 20000 includes the distributed ledger 25000 and the sub-ledger 25100. On the smart contract 26000 on the distributed ledger 25000, logics corresponding to the node additivity determination request unit 21500, the node additivity determination unit 21600, the node additivity determination request logic 23000, the consortium additivity determination request logic 23100, and the consortium additivity determination logic 24100 are held.

On the other hand, on the smart contract 26100 on the sub-ledger, logics corresponding to the node additivity determination unit 21600 and the node additivity determination logic 24000 are held. The other configurations are equal to those of the first embodiment except that the member management node 30000 does not include the organization structure management table 32100.

In addition, FIG. 22B illustrates the state information 28000 which is managed on the distributed ledger 25000. In this embodiment, a sub-group management contract is held on the distributed ledger node 20000, and a data region is prepared even in the state. The state information 28000 includes the ID 28010 which is an identifier of the contract, the subject 28020 of the contract, and the internal table 28030 to hold the SC execution result.

The content of the internal table is updated whenever TX is performed. An organization structure management table 28060 which holds the internal table in the sub-group management SC is equivalent to the member management table 32000 of the member management node 30000 illustrated in FIG. 4B in the first embodiment.

In this configuration, the node additivity determination process of FIG. 9 among a series of processes illustrated in FIGS. 9, and 13 to 16 is performed by the smart contract 26100 on the sub-ledger 25100, and the other processes are performed by the smart contract 26000 on the distributed ledger 25000.

Figure 23:
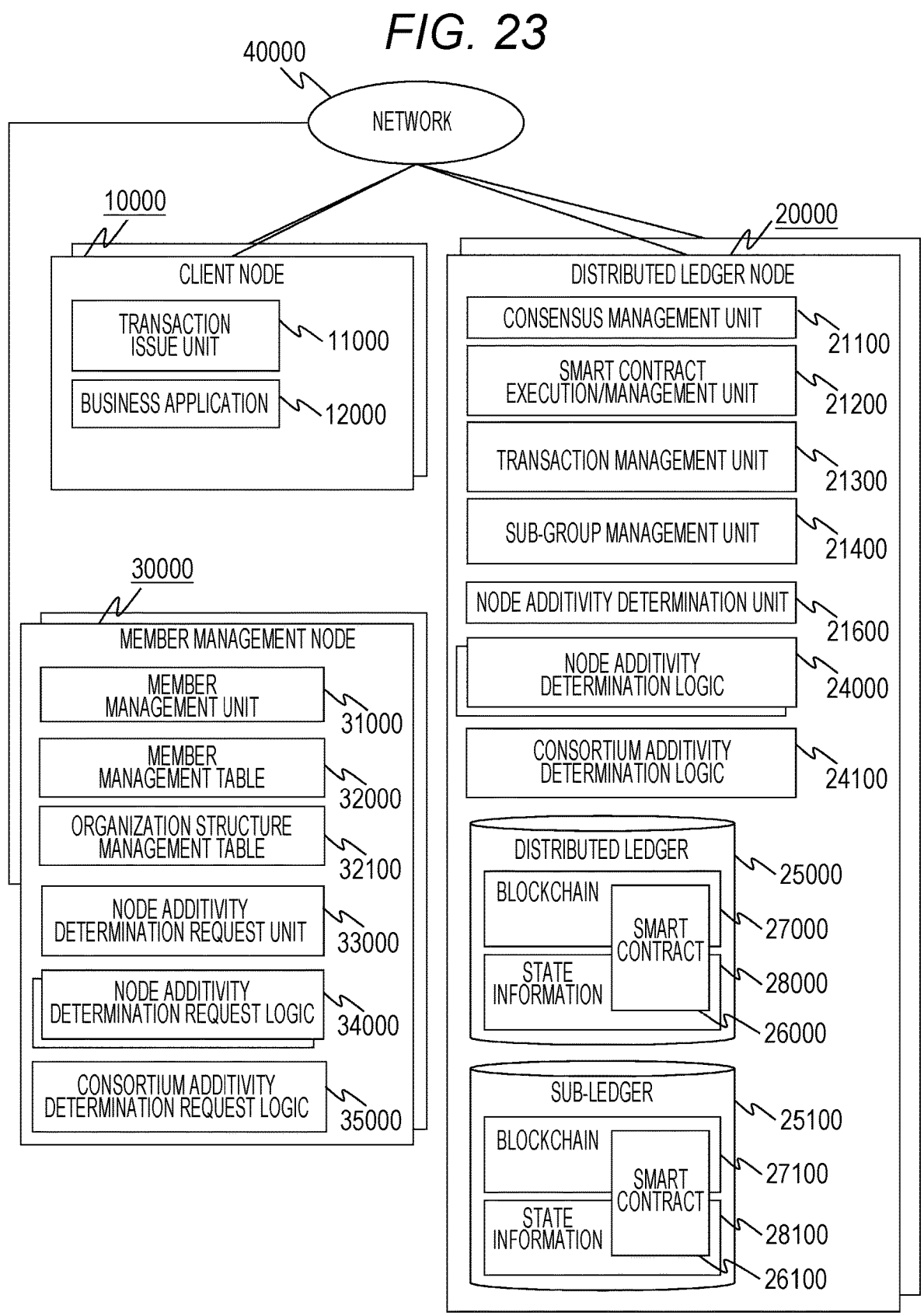
FIG. 23 is a diagram illustrating an exemplary configuration of the calculator system in the second embodiment.

In addition, the first and second embodiments, the node additivity determination request unit 21500, the node additivity determination request logic 23000, and the consortium additivity determination request logic 23100 held in the distributed ledger node 20000 may be held by the member management node 30000. FIG. 23 schematically illustrates an exemplary computer system.

In this case, the member management node 30000 includes a node additivity determination request unit 33000, a node additivity determination request logic 34000, and a consortium additivity determination request logic 35000. The other configurations are similar to those of the first embodiment.

In this configuration, in step 53040 of FIG. 7 and steps 56060 and 56080 of FIG. 13, the sub-group management unit 21400 of the distributed ledger node 20000 causes the node additivity determination request unit 33000 on the member management node 30000 instead of the node additivity determination request unit of the own node to perform a node additivity determination request and a consortium additivity determination request.

Hitherto, the invention has been specifically described on the preferred embodiments. However, the invention is not limited to the above embodiments, and various changes can be made in a scope not departing from the spirit.

According to this embodiment, it is possible to determine whether a new participation of the organization is possible on the agreement among the organizations participating in the consortium or the sub-group when the participation organization is added to the consortium or the sub-group. At this time, another organization which is able to evaluate a contract abiding ability (reliability) of the organization is appropriately requested for the determination on the participation. As a result, after the contract abiding ability (reliability) of the addition target organization is evaluated, the organization addition can be performed in a non-centralized manner. In addition, in a case where an organization outside the consortium tries to newly participate in the consortium or the sub-group, the organization may request the participation from any organization of the consortium or the sub-group. In addition, the existing participant in the consortium does not need to disclose a role of each organization in the consortium or the sub-group to the organization which tries to newly participate.

In other words, an affiliation process of a member in the blockchain of the consortium type can be efficiently performed while securing reliability.

According to the description of this specification, at least the following will be apparent. In other words, in the organization management support system of this embodiment, the distributed ledger system has a logical division function of sharing a sub-ledger obtained by logically dividing a distributed ledger only in a sub-group of a predetermined organization group in the business network. In a case where the request unit receives a request for a new participation to the sub-group from a second node of a second organization which is the specific organization, a first node held by a first organization belonging to the sub-group may request a determination from a third node of a third organization which is the other organization on the distributed ledger system about the participation of the second organization to the sub-group, collect a determination result of at least the third node in the management unit, finally determine the participation on the basis of the collected result, and reply to the second node with a result of the final determination.

According to this configuration, it is possible to determine new participation to the sub-group which is an important operation form in a consortium-type blockchain. Further, an affiliation of a member in the consortium-type blockchain can be more efficiently managed with reliability.

In addition, in the organization management support system of this embodiment, a predetermined node of the organization may include a node additivity determination program in which the participation to a consortium or the sub-group corresponding to the business network is determined, and a node additivity determination request program in which a node of a determination request destination is determined among the nodes of the distributed ledger system to request the determination, collects the determination result, and finally determines the participation on the basis of the collected result.

According to this configuration, it is possible to determine the new participation to the consortium itself or to a predetermined sub-group which participates in the consortium and is included in the consortium. Further, an affiliation of a member in the consortium-type blockchain can be more efficiently managed with reliability.

In addition, in the organization management support system of this embodiment, a predetermined management node installed separately from a distributed ledger node in the distributed ledger system may hold and execute the node additivity determination request program.

According to this configuration, not all the nodes on the distributed ledger system perform a process, but the management node that receives a participation request leads the determination request and the collection of the result. Further, an affiliation of a member in the consortium-type blockchain can be more efficiently managed with reliability.

In addition, in the organization management support system of this embodiment, a predetermined node of the organization may share a smart contract defining a form of business or operation to be performed on the distributed ledger after making an agreement among participation nodes belonging to the consortium or the sub-group, perform the smart contract on the agreement among the participation nodes, add an execution result of the smart contract time-sequentially on the distributed ledger of the participation node, and execute the node additivity determination request program after sharing the smart contract among the participation nodes of the consortium or the sub-group.

According to this configuration, the participation determination process of the participation request is shared in a form of the smart contract, and is performed fairly and efficiently. Further, the affiliation process of a member in the consortium-type blockchain can be more efficiently performed with reliability.

In addition, In addition, in the organization management support system of this embodiment, a predetermined management node installed separately from a distributed ledger node in the distributed ledger system may select a node to perform the node additivity determination request program.

According to this configuration, not all the nodes on the distributed ledger system perform a process, but the management node that receives a participation request selects a target node of the determination request. Further, an affiliation of a member in the consortium-type blockchain can be more efficiently managed with reliability.

In addition, in the organization management support system of this embodiment, a predetermined node of the organization may execute the node additivity determination program after sharing the smart contract among the participation nodes of the consortium or the sub-group.

According to this configuration, the participation determination process of the participation request is shared in a form of the smart contract, and is performed fairly and efficiently among the participation nodes of the consortium or the sub-group. Further, the affiliation process of a member to the consortium or the sub-group in the consortium-type blockchain can be efficiently performed with more reliability.

In addition, in the organization management support system of this embodiment, when determining participation of the second node to the sub-group, the first or third node may refer to a past transaction history related to the second organization written in a sub-ledger which the first or third node is able to refer to.

According to this configuration, a past transaction history can be referred as the information related to credit which is necessary for determining the participation. Further, the affiliation process of a member in the consortium type the blockchain can be more efficiently performed with more reliability.

In addition, in the organization management support system of this embodiment, in a case where a request for new participation of the second node is a participation request to a second sub-group different from a first sub-group where the first node belongs, the first node may specify each node belonging to the second sub-group as the third node.

According to this configuration, a node of the sub-group may be selected as an entity of determining the participation with respect to the request for new participation to the sub-group so as to perform the determination process. Further, an affiliation of a member in the consortium-type blockchain can be more efficiently managed with reliability.

In addition, in the organization management support system of this embodiment, when each node belonging to the second sub-group is specified as the third node, the first node may refer to a sub-group management table which lists all nodes belonging to a sub-group in the distributed ledger system and the sub-group.

According to this configuration, the third node can be specified with efficiency on the basis of the sub-group management table. Further, an affiliation of a member in the consortium-type blockchain can be more efficiently managed with reliability.

In addition, in the organization management support system of this embodiment, when each node belonging to the second sub-group is specified as the third node, the first node may refer to a sub-group management table which lists a sub-group in the distributed ledger system and a representative node of the sub-group, and inquire of the representative node about a node belonging to the sub-group to specify the node as the third node.

According to this configuration, the first node does not retrieve and select all the nodes with respect to the target sub-group of the request of new participation. However, the process can be delegated to the representative node which already grasps the belonging nodes. Further, an affiliation of a member in the consortium-type blockchain can be more efficiently managed with reliability.

In addition, in the organization management support system of this embodiment, in a case where a request for new participation of the second node is a participation request to a second sub-group different from a first sub-group where the first node belongs, the first node may specify the representative node of the second sub-group as the third node.

According to this configuration, the first node does not retrieve and select all the nodes with respect to the target sub-group of the request of new participation, and not request for the actual determination. However, the process can be delegated to the representative node which already grasps the belonging nodes. Further, an affiliation of a member in the consortium-type blockchain can be more efficiently managed with reliability.

What is claimed is:

1. An organization management support system for dynamically configuring a distributed ledger infrastructure for management and execution of a smart contract for a business network of organizations, wherein the distributed ledger infrastructure includes a plurality of device nodes connected to a network through a physical communication line, the system comprising:
   one or more client nodes, wherein each client node corresponds to a separate organization of the business network and is configured to receive an input from an organization relating to a transaction, issue the transaction on behalf of an organization, and transmit a transaction history of the transaction to a distributed ledger node;
   one or more member management nodes configured to provide registration information and authentication information to a client node of an organization of the business network, and manage a sub-group of a predetermined organization group in the business network comprising one or more client nodes; and one or more distributed ledger nodes installed separately from the member management nodes and comprising a distributed ledger and a sub-ledger, wherein each of the distributed ledger and the sub-ledger stores and executes smart contracts, the distributed ledger nodes further comprising:

a node additivity determination request unit configured to:
- receive a request for a a determination on a participation to a sub-group of a participation request source node on the distributed ledger system which is outside the business network,
- collect responses from client nodes in the sub-group, wherein each response indicates whether an organization agrees or disagrees with the participation to the sub-group of the participation request source node, and
- determine whether the ratio of responses indicating agreement to the responses indicating disagreement exceeds a predetermined value; and a sub-group management unit configured to collect determination results from the node additivity determination unit, finally determine the participation on the basis of the determination results, and if the participation request source node may participate in the subgroup, issue an instruction to a member management node managing the sub-group to add the participation request source node to the subgroup.

2. The organization management support system according to claim 1,
wherein a predetermined client node of an organization shares a smart contract defining a form of business or operation to be performed on the distributed ledger after making an agreement among participation client nodes belonging to the business network or the sub-group to which the predetermined client node belongs, performs, through a distributed ledger node, the smart contract on the agreement among the participation client nodes, adds an execution result of the smart contract time-sequentially on the distributed ledger node, returns the execution result of the smart contract to the predetermined client node, and submits a request to the node additivity determination request unit as the smart contract is shared among the participation client nodes of the business network or the sub-group.

3. The organization management support system according to claim 2,
wherein a predetermined member management node installed separately from a distributed ledger node in the distributed ledger infrastructure selects a distributed ledger node which executes the smart contract, wherein a smart contract may be defined by a logic stored in a distributed ledger node describing data related to a transaction, wherein the logics which define smart contracts include:
node additivity determination request logic;
consortium additivity determination request logic;
consortium additivity determination request logic;
node additivity determination logic; and
and consortium additivity determination logic.

4. The organization management support system according to claim 3,
wherein a predetermined distributed ledger node defines and executes the node additivity determination logic as the smart contract shared among the participating client nodes of the business network or the sub-group.

5. The organization management support system according to claim 1,
wherein, when determining participation of a second node to a sub-group, wherein the second node is a participation request source node, and wherein a first node and third node are members of the subgroup, the first node or third node refers to a past transaction history related to the second organization and written in a sub-ledger, which the first node or third node is able to reference, to form their respective responses concerning the participation to the sub-group of the second node.

6. The organization management support system according to claim 1,
wherein, in a case where a request for new participation of a second node is a participation request to a second sub-group different from a first sub-group to which the first node belongs, the first node specifies each node belonging to the second sub-group as the third node.

7. The organization management support system according to claim 6,
wherein, when each node belonging to the second sub-group is specified as the third node, the first node refers to a sub-group management table which lists the sub-group in the distributed ledger system and all nodes belonging to the sub-group.

8. The organization management support system according to claim 6,
wherein, when each node belonging to the second sub-group is specified as the third node, the first node refers to a sub-group management table which lists the sub-group in the distributed ledger system and a representative node of the sub-group, and inquires of the representative node about a node belonging to the sub-group to specify the node as the third node.

9. The organization management support system according to claim 6,
wherein, in a case where a request for new participation of the second node is a participation request to a second sub-group different from a first sub-group to which the first node belongs, the first node specifies a representative node of the second sub-group as the third node.

10. The organization management support system according to claim 1, wherein a client node of an organization comprises:
a transaction issue unit configured to issue a transaction on behalf of the organization; and
a business application configured to receive an input of information related to an organization's ordering or shipping of a component and transmit a transaction history of the component to the distributed ledger node.

11. An organization management support method system for dynamically configuring a distributed ledger infrastructure for management and execution of a smart contract for a business network of organizations, wherein the distributed ledger infrastructure includes a plurality of device nodes connected to a network through a physical communication line, the method comprising:
by one or more client nodes, wherein each client node corresponds to a separate organization of the business network, receiving an input from an organization relating to a transaction, issuing the transaction on behalf of an organization, and transmitting a transaction history of the transaction to a distributed ledger node;
by one or more member management nodes, providing registration information and authentication information to a client node of an organization of the business network, and managing a sub-group of a predetermined organization group in the business network comprising one or more client nodes; and by one or more distributed ledger nodes installed separately from the member management nodes and comprising a distributed ledger and a sub-ledger, storing and executing smart contracts in each of the distributed ledger and the sub-ledger, wherein the distributed ledger nodes are further configured to:
  by a node additivity determination request unit, receive a request for a determination on a participation to a sub-group of a participation request source node on the distributed ledger system which is outside the business network,
  collect responses from client nodes in the sub-group, wherein each response indicates whether an organization agrees or disagrees with the participation to the sub-group of the participation request source node, and
  determine whether the ratio of responses indicating agreement to the responses indicating disagreement exceeds a predetermined value; and
by a sub-group management unit collect determination results from the node additivity determination unit finally determine the participation on the basis of the determination results, and if the participation request source node may participate in the subgroup, issue an instruction to a member management node managing the sub-group to add the participation request source node to the subgroup.

12. An organization management support apparatus for dynamically configuring a distributed ledger infrastructure for management and execution of a smart contract for a business network of organizations, wherein the distributed ledger infrastructure includes a plurality of device nodes connected to a network through a physical communication line, the apparatus, comprising:
  one or more client nodes, wherein each client node corresponds to a separate organization of the business network and is configured to receive an input from an organization relating to a transaction, issue the transaction on behalf of an organization, and transmit a transaction history of the transaction to a distributed ledger node;
  one or more member management nodes configured to provide registration information and authentication information to a client node of an organization of the business network, and manage a sub-group of a predetermined organization group in the business network comprising one or more client nodes; and
  one or more distributed ledger nodes installed separately from the member management nodes and comprising a distributed ledger and a sub-ledger, wherein each of the distributed ledger and the sub-ledger stores and executes smart contracts, the distributed ledger nodes further comprising:
  a node additivity determination request unit configured to:
    receive a request for a determination on a participation to a sub-group of a participation request source node on the distributed ledger system which is outside the business network,
    collect responses from client nodes in the sub-group, wherein each response indicates whether an organization agrees or disagrees with the participation to the sub-group of the participation request source node, and
    determine whether the ratio of responses indicating agreement to the responses indicating disagreement exceeds a predetermined value; and
  a sub-group management unit configured to collect determination results from the node additivity determination unit finally determine the participation on the basis of the determination results, and if the participation request source node may participate in the subgroup, issue an instruction to a member management node managing the sub-group to add the participation request source node to the subgroup.

* * * * *